United States Patent
Kumagai

(10) Patent No.: US 8,929,562 B2
(45) Date of Patent: Jan. 6, 2015

(54) SYSTEM, AUDIO GUIDANCE OUTPUT CONTROL METHOD, TRANSMISSION DEVICE, AND RECEPTION DEVICE

(75) Inventor: Atsushi Kumagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 13/052,693

(22) Filed: Mar. 21, 2011

(65) Prior Publication Data

US 2011/0255707 A1 Oct. 20, 2011

(30) Foreign Application Priority Data

Apr. 15, 2010 (JP) ................................ 2010-094483

(51) Int. Cl.
*H04B 3/00* (2006.01)
*H04N 1/00* (2006.01)

(52) U.S. Cl.
CPC ....... *H04N 1/00278* (2013.01); *H04N 1/00488* (2013.01); *H04N 2201/0053* (2013.01)
USPC ............. 381/77; 358/409; 358/434; 358/435; 358/436

(58) Field of Classification Search
USPC .............. 381/77; 358/78, 1.1–1.18, 409, 434, 358/435, 436; 708/173; 355/78
See application file for complete search history.

(56) References Cited

U.S. PATENT DOCUMENTS

| | | | | |
|---|---|---|---|---|
| 5,726,762 A | * | 3/1998 | Akada et al. | 358/401 |
| 6,705,611 B2 | * | 3/2004 | Kato | 273/143 R |
| 7,551,297 B2 | * | 6/2009 | Koakutsu | 358/1.1 |
| 8,203,739 B2 | * | 6/2012 | Nakamura | 358/1.15 |
| 8,218,181 B2 | * | 7/2012 | Nakamura | 358/1.15 |
| 8,294,931 B2 | * | 10/2012 | Yamaguchi et al. | 358/1.15 |
| 2006/0116883 A1 | * | 6/2006 | Kawamura et al. | 704/271 |
| 2009/0059281 A1 | * | 3/2009 | Murahashi et al. | 358/1.15 |

FOREIGN PATENT DOCUMENTS

| | | |
|---|---|---|
| JP | 2004-254006 | 9/2004 |
| JP | 2006-331251 A | 12/2006 |
| JP | 2007-114537 A | 5/2007 |
| JP | 2007034616 | * 8/2007 |
| JP | 2009-294310 A | 12/2009 |

OTHER PUBLICATIONS

Nov. 25, 2013 Japanese Office Action that issued in Japanese Patent Application No. 2010-094483.

* cited by examiner

*Primary Examiner* — Davetta W Goins
*Assistant Examiner* — Oyesola C Ojo
(74) *Attorney, Agent, or Firm* — Cowan, Liebowitz & Latman, P.C.

(57) ABSTRACT

In a system in which a transmission device and reception device communicate with each other, the transmission device has a first output unit which outputs a first audio guidance, and a transmission unit which transmits, to the reception device, an output instruction that instructs the reception device to output a second audio guidance related to the first audio guidance at a timing corresponding to an output timing of the first guidance, and the reception device has a reception unit which receives the output instruction transmitted by the transmission unit, and an output unit which outputs the second audio guidance at a timing according to the output instruction received by the reception unit.

23 Claims, 14 Drawing Sheets

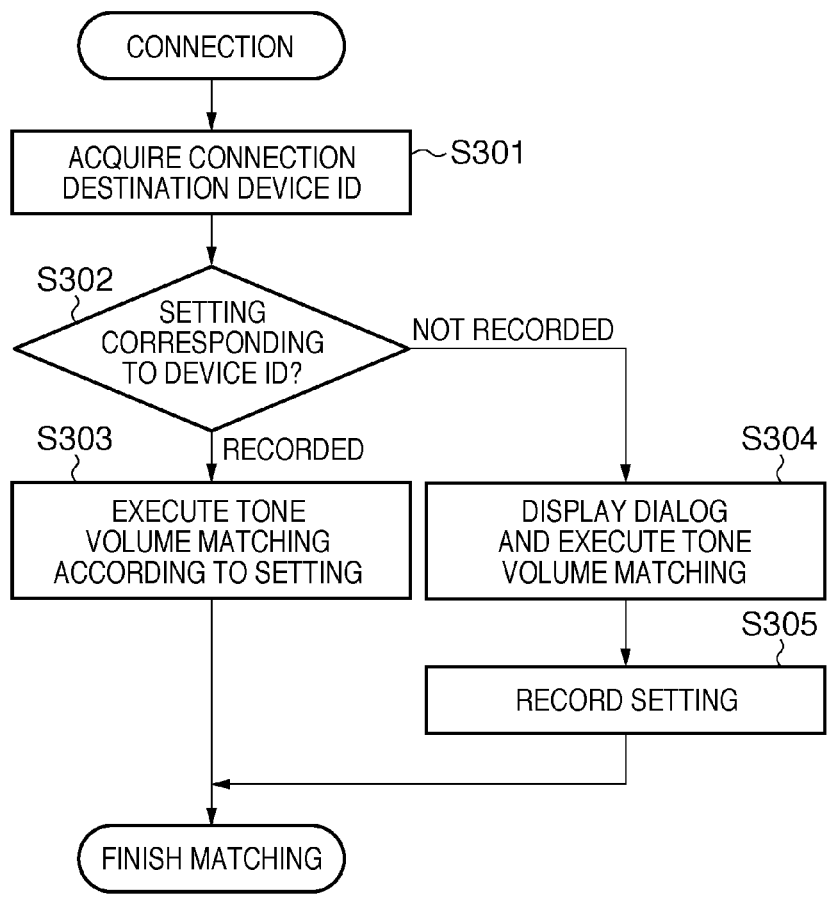

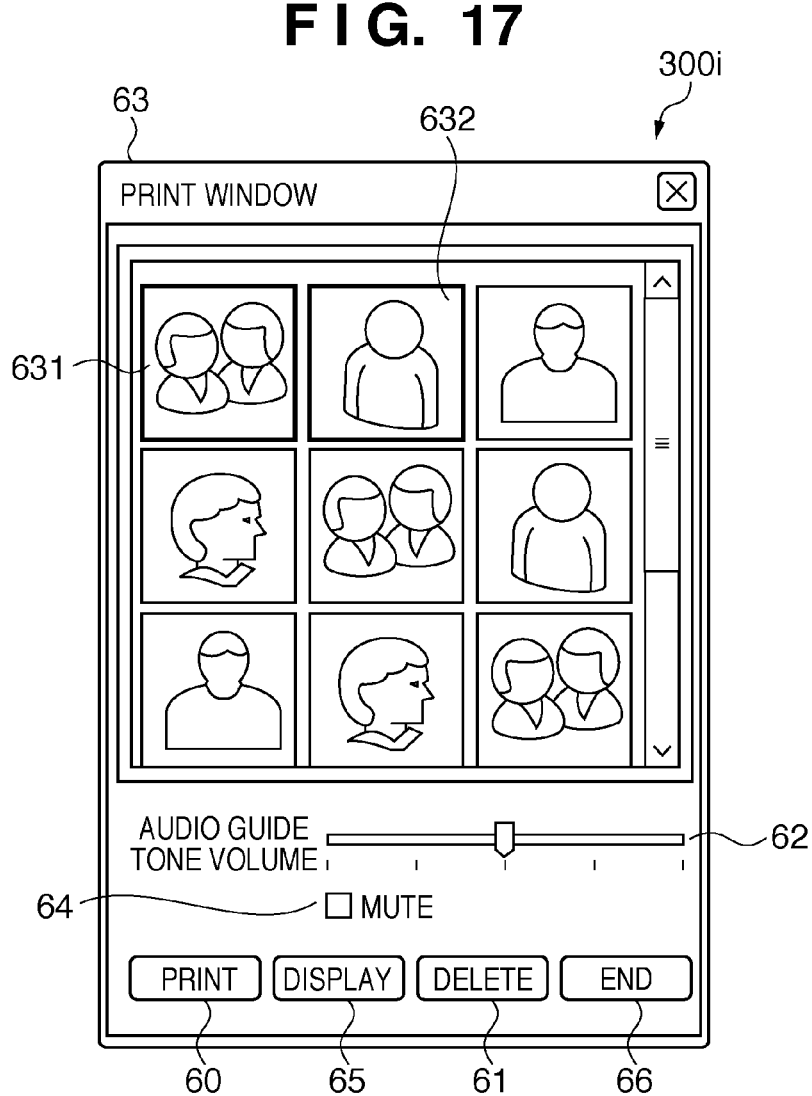

SYSTEM, AUDIO GUIDANCE OUTPUT CONTROL METHOD, TRANSMISSION DEVICE, AND RECEPTION DEVICE

BACKGROUND OF THE INVENTION

1. Field of the Invention

The present invention relates to an audio guidance output control technique.

2. Description of the Related Art

Conventionally, a processing apparatus, which receives and processes data, and which informs, for example, start, end, and states of progress of processing using audio guidances is known.

For example, Japanese Patent Laid-Open No. 2004-254006 describes that in a digital TV 100, the states of the digital TV 100 are notified using notification sounds or audio guidances from a loudspeaker 104 (see FIG. 1 of Japanese Patent Laid-Open No. 2004-254006).

With conventional technology, the operations of a device can be confirmed using audios. However, when a plurality of related processes are to be executed by a plurality of devices, if individual devices reproduce audios corresponding to individual operations so as to make the user confirm the operations of the respective devices, the plurality of audios overlap each other, and it is difficult for the user to recognize the states of the respective devices.

SUMMARY OF THE INVENTION

The present invention provides a system which can control reproduction timings of audios by respective devices so as to prevent the audios from being superposed when a plurality of devices reproduce audios.

According to the first aspect there is provided a system in which a transmission device and a reception device communicate with each other, the transmission device comprising: a first output unit which outputs a first audio guidance; and a transmission unit which transmits, to the reception device, an output instruction which instructs the reception device to output a second audio guidance related to the first audio guidance and controls to start output of the second audio guidance in the reception device at a timing delayed from an output start timing of the first audio guidance in the transmission device, and the reception device comprising: a reception unit which receives the output unit transmitted from the transmission unit; and an output unit which outputs the second audio guidance at a timing according to the output instruction received by the reception unit.

According to the second aspect there is provided an output control method of an audio guidance in a system in which a transmission device having a first output unit which outputs a first audio guidance and a reception device having a second output unit which outputs a second audio guidance related to the first audio guidance communicate with each other, the method comprising: a transmission step of transmitting, to the reception device, an output instruction which instructs the reception device to output the second audio guidance and controls to start output of the second audio guidance in the reception device at a timing delayed from an output start timing of the first audio guidance in the transmission device; and an output step of controlling the second output unit to output the second audio guidance at a timing according to the output instruction.

According to the third aspect there is provided a transmission device in a system in which a transmission device having a first output unit which outputs a first audio guidance and a reception device having a second output unit which outputs a second audio guidance related to the first audio guidance communicate with each other, the device comprising: a transmission unit which transmits, to the reception device, an output instruction which instructs the second output unit to output the second audio guidance and controls to start output of the second audio guidance in the reception device at a timing delayed from an output start timing of the first audio guidance in the transmission device.

According to the fourth aspect there is provided a reception device in a system in which a transmission device having a first output unit which outputs a first audio guidance and a reception device having a second output unit which outputs a second audio guidance related to the first audio guidance communicate with each other, the device comprising: a reception unit which receives, from the transmission device, an output instruction which instructs the second output unit to output the second audio guidance and controls to start output of the second audio guidance in the reception device at a timing delayed from an output start timing of the first audio guidance in the transmission device; an audio data reception unit which receives audio data of the second audio guidance before the output instruction is received; and an output control unit which controls the second output unit to output the second audio guidance based on the output instruction, wherein the system is a system in which a plurality of devices including the transmission device and the reception device executes a series of processes in a coordinated manner, the first audio guidance is an audio guidance corresponding to a first process executed by the transmission device, and the second audio guidance is an audio guidance corresponding to a second process which is executed by the reception device in correspondence with the first process, and the output instruction includes information which instructs an output timing of the second audio guidance, and information which identifies the audio data of the second audio guidance.

Further features of the present invention will become apparent from the following description of exemplary embodiments with reference to the attached drawings.

BRIEF DESCRIPTION OF THE DRAWINGS

FIG. 13 is a flowchart showing the operation of a computer 22$i$;

FIG. 14 is a view showing an example of setting information;

FIG. 17 is a view showing another example of a print window 300i;

FIG. 18 is a view showing the configuration of tone volume matching data 170.

DESCRIPTION OF THE EMBODIMENTS

<First Embodiment>

Figure 1:
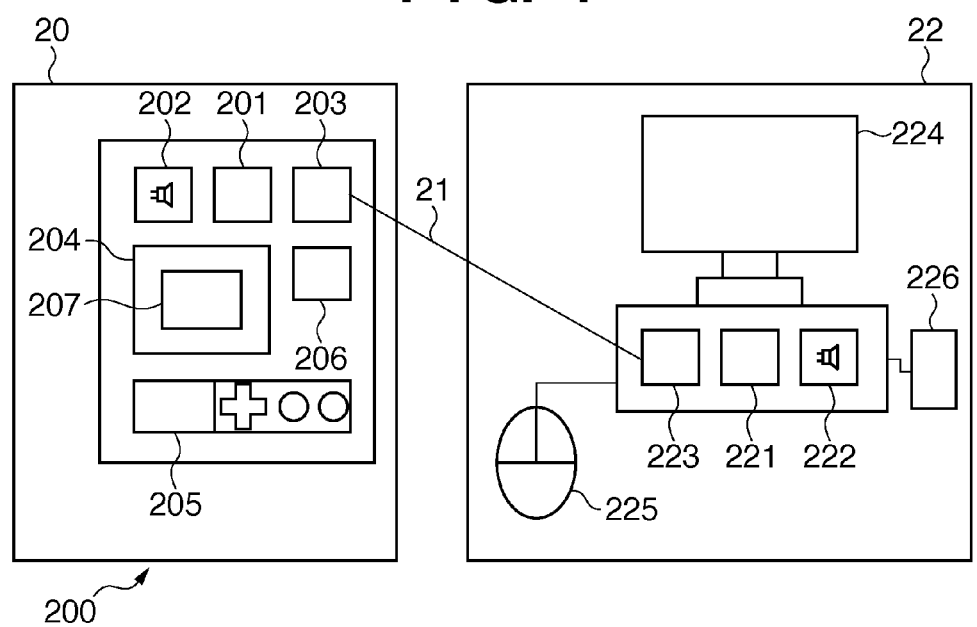
FIG. 1 is a block diagram showing the arrangement of a system according to the present invention.

The arrangement of a system according to the first embodiment of the present invention will be described below with reference to FIG. 1.

A system 200 includes a plurality of devices. The plurality of devices includes, for example, a printer 20 and computer 22. The printer 20 and computer 22 are configured to be connected to each other via a communication cable 21.

The printer 20 has a control unit 201, audio output unit (second output unit) 202, communication unit 203, print unit 204, operation unit 205, and storage unit 206. The print unit 204 incorporates an exchangeable ink cartridge 207. The control unit 201 controls the print unit 204 to execute print processing (second processing), controls the audio output unit 202 to output an audio, and controls the operation unit 205 to display a screen in response to reception of data from the computer 22 via the communication unit 203 and user's operations at the operation unit 205. The control unit (output control unit) 201 reads out a program from a program memory (not shown), and controls the respective units and makes arithmetic operations based on the readout program, thus executing processing to be described later. The audio output unit 202 outputs, for example, an audio guidance, as will be described later. Also, the control unit 201 can transmit data to the computer 22 via the communication unit 203. The communication unit 203 exchanges data with the computer 22 via the communication cable 21 under the control of the control unit 201.

The computer 22 has a control unit 221, audio output unit (first output unit) 222, communication unit 223, display 224, operation unit 225, and storage unit 226. The control unit 221 controls the display 224 to display a screen, and controls the audio output unit 222 to output an audio in response to reception of data from the printer 20 via the communication unit 223 and user's operations at the operation unit 225. The control unit 221 reads out a program from a program memory (not shown), and controls the respective units and makes arithmetic operations based on the readout program, thus executing processing to be described later. The audio output unit 222 outputs, for example, an audio guidance, as will be described later. The operation unit 225 includes, for example, a mouse and keyboard. The control unit 221 can also transmit data to the printer 20 via the communication unit 223. The communication unit 223 exchanges data with the printer 20 via the communication cable 21 under the control of the control unit 221.

Figure 2:
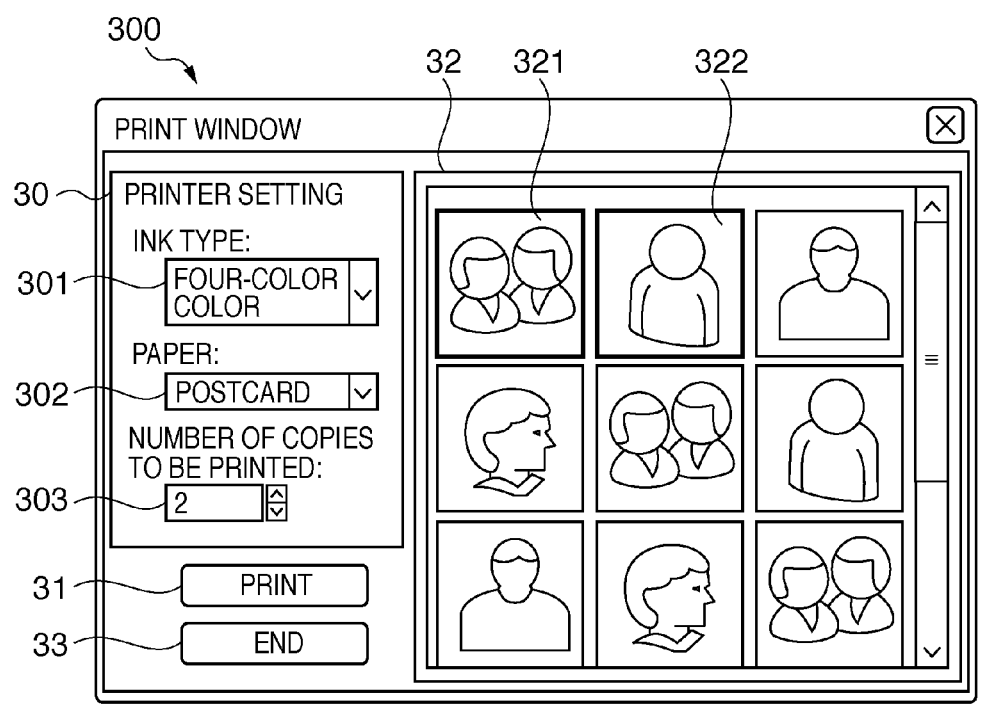
FIG. 2 is a view showing an example of a print window 300.

An example of a print window 300 as a GUI screen, which is displayed on the display 224 of the computer 22 and is used to instruct the printer 20 to execute print execution processing will be described below with reference to FIG. 2.

The print window 300 has a printer setting area 30, print button 31, end button 33, and image selection area 32. The printer setting area 30 includes a list box 301 used to select an ink type used in printing, a list box 302 used to select a paper type, and an edit box 303 used to set the number of copies to be printed. The image selection area 32 displays a list of a plurality of representative images indicating a plurality of image files recorded in the storage unit 226, and highlights a representative image corresponding to an image file selected by the user. FIG. 2 shows a state in which the user selects two representative images 321 and 322.

In this state, when the user clicks the print button 31, the computer 22 recognizes that a print instruction is accepted from the user, and supplies the print instruction to the control unit 221. The control unit 221 executes print instruction processing (first processing) in response to the supplied print instruction (output instruction). That is, the control unit 221 controls the audio output unit 222 to output an audio guidance related to the print instruction processing, and controls the communication unit 223 to transmit data required to cause the printer 20 to execute the print execution processing. With this control, the print instruction processing (audio data transmission) is executed. That is, the audio output unit 222 outputs a first audio guidance, and the communication unit 223 transmits print data 40 and audio guidance synchronization data 50 (to be described later) to the printer 20 via the communication cable 21 in synchronism with the output operation. This processing can instruct the printer 20 to execute the print execution processing of the selected image files. That is, the computer 22 and printer 20 as the plurality of devices execute a series of processes including the print instruction processing and print execution processing in a coordinated manner. The computer executes the print instruction processing, and the printer then executes the print execution processing in response to the print instruction processing. In this case, "synchronization" does not mean that a plurality of audio guidances begin to be output at the same timing, but the plurality of audio guidances are said to be "synchronized" when their output start timings are coordinated and related to each other.

When the user clicks the end button 33, the print window 300 is closed on the display 224.

Figure 3:
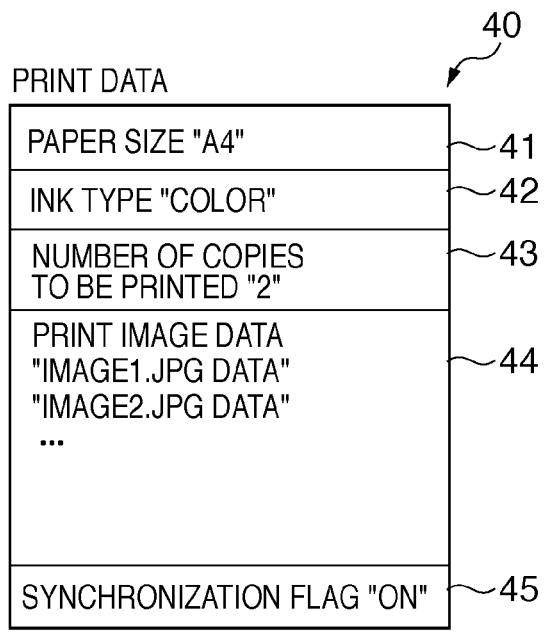
FIG. 3 is a view showing the configuration of print data 40.

The configuration of the print data 40, which is transmitted from the computer 22 to the printer 20 in the print instruction processing, will be described below with reference to FIG. 3.

The print data 40 has paper size data 41, ink type data 42, print copy number data 43, print image data 44, and a synchronization flag 45. The paper size data 41 is data indicating a paper size used in printing in the form of a management ID on the printer 20. FIG. 3 exemplifies a case in which the paper size data 41 includes a management ID "A4" indicating an A4 paper size. The ink type data 42 is data indicating an ink type used in printing in the form of a management ID on the printer 20. FIG. 3 exemplifies a case in which the ink type data 42 includes a management ID "color" indicating a color ink type. The print copy number data 43 is data used to set, using a numerical value, the number of copies to be printed of each image included in the print image data 44. FIG. 3 exemplifies a case in which the print copy number data 43 sets to print two copies of each image included in the print image data 44. The synchronization flag 45 is data used to set a flag indicating whether or not the printer 20 outputs an audio guidance in synchronism with the computer 22. In FIG. 3, the synchronization flag 45 is set "ON" to indicate that the printer 20 outputs an audio guidance in synchronism with the computer 22. Note that the synchronization flag 45 is set "OFF" when the printer 20 does not output an audio guidance in synchronism with the computer 22.

In this embodiment, the print data describes the synchronization flag. Alternatively, synchronization ON/OFF data may be transmitted to the printer independently of the print data.

Figure 4:
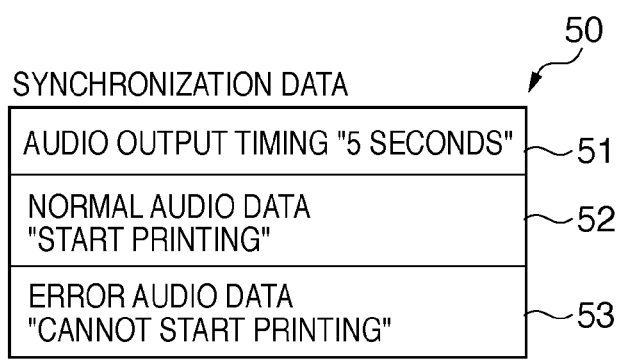
FIG. 4 is a view showing the configuration of audio guidance synchronization data 50.

The configuration of the audio guidance synchronization data 50, which is transmitted from the computer 22 to the printer 20 in the print instruction processing, will be described below with reference to FIG. 4.

The audio guidance synchronization data 50 has audio output timing data 51, normal audio data 52, and error audio data 53.

The audio output timing data 51 includes an instruction required to output an audio guidance related to the print execution processing at a timing synchronized with finishing of an output operation of an audio guidance output from the computer at the time of the print instruction processing. For example, when the communication unit 223 of the computer 22 transmits the audio guidance synchronization data at the output start timing of an audio guidance to be output by the computer at the time of the print instruction processing, the audio output timing data 51 sets a time period decided according to an output time period of an audio guidance output by the computer at the time of the print instruction processing. The audio output timing data 51 sets an audio output timing by means of a time period (seconds) after a reception (audio data reception) timing of the audio guidance synchronization data by the printer 20.

The normal audio data 52 is sampling audio data indicating the contents of an audio guidance to be output by the printer 20 when the print execution processing is normally started. Also, the error audio data 53 is sampling audio data indicating the contents of an audio guidance to be output by the printer 20 when the print execution processing cannot be normally started. In this case, the storage unit 226 in the computer 22 stores a plurality of normal audio data and a plurality of error audio data. The control unit 221 in the computer 22 selects data to be included in the audio guidance synchronization data 50 from the plurality of normal audio data and the plurality of error audio data stored in the storage unit 226 in accordance with a type of a series of processes. The control unit 221 sets the selected data as the normal audio data 52 and error audio data 53, respectively.

Operations of the respective devices when the plurality of devices (computer 22 and printer 20) executes a series of processes in a coordinated manner will be described below.

Figure 5:
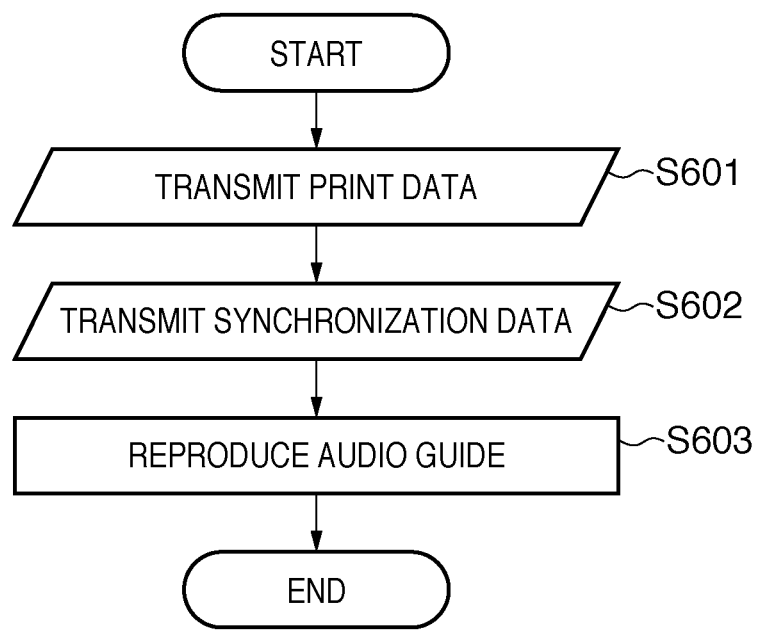
FIG. 5 is a flowchart showing the operation of a computer 22.

FIG. 5 shows processes executed by the computer 22 when the user clicks the print button 31.

In step S601, the control unit 221 generates the print data 40 based on the contents set on the printer setting area 30 and image data of image files selected on the image selection area 32, and controls the communication unit 223 to transmit the generated print data 40 to the printer 20 via the communication cable 21. Also, the control unit 221 sets "ON" as the synchronization flag 45 to instruct the printer 20 to output an audio guidance in synchronism with the computer 22.

In step S602, the control unit 221 generates the audio guidance synchronization data 50, and controls the communication unit 223 to transmit the generated audio guidance synchronization data 50 to the printer 20 via the communication cable 21. As described above, the audio guidance synchronization data 50 includes audio data of audio guidances to be output by the printer, and an instruction required to output an audio guidance at a timing synchronized with finishing of an output operation of an audio guidance by the computer.

After transmission of the audio guidance synchronization data is finished, the audio output unit 222 outputs an audio guidance to be output at the time of the print instruction processing in step S603.

Figure 7:
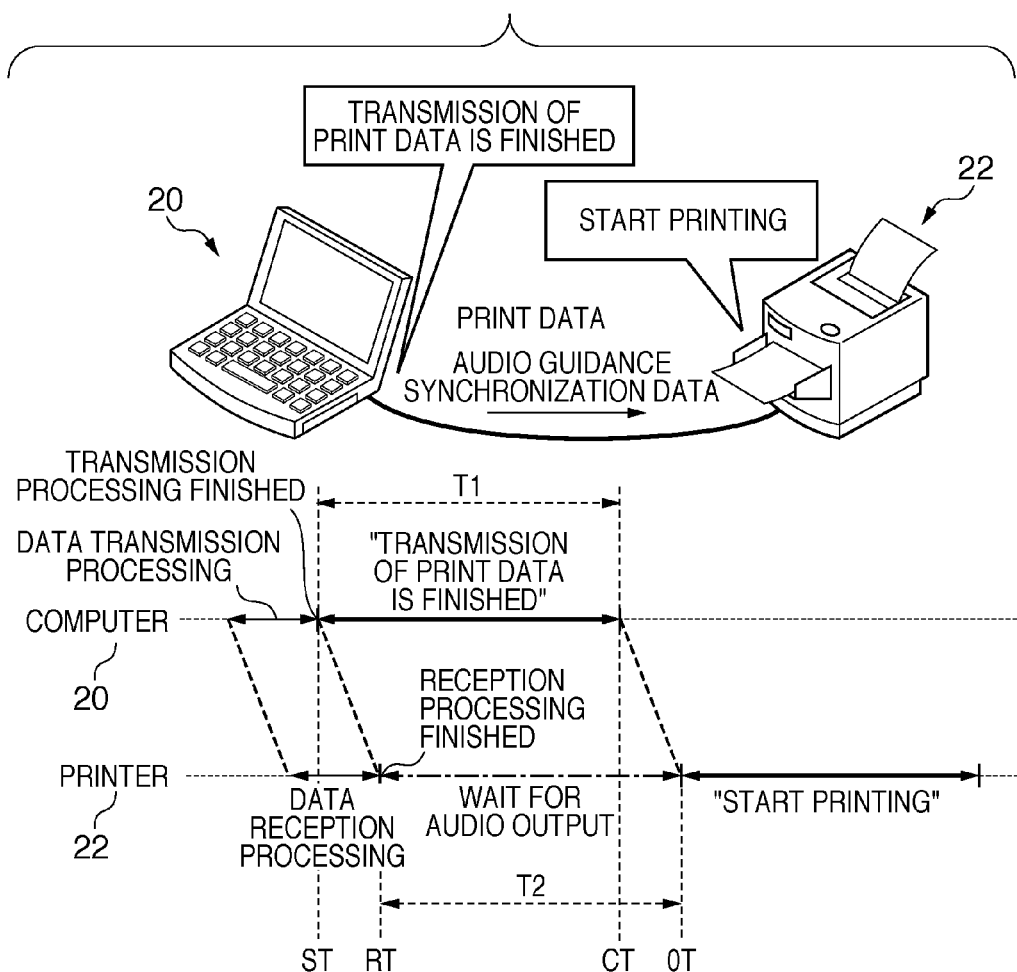
FIG. 7 is a view showing synchronization of audio guidances.

The audio guidance output timings of the computer and printer will be described below with reference to FIG. 7.

The computer begins to output an audio guidance "transmission of print data is finished" to be output in the print instruction processing at a transmission finish timing ST of the audio guidance synchronization data. The computer outputs the audio guidance to be output in the print instruction processing during a period T1. After a reception finish timing RT of the audio guidance synchronization data, the printer does not immediately begin to output audio data included in the audio guidance synchronization data, but it outputs an audio guidance to be output at the time of the print execution processing in the printer after it waits for a period T2 set by the audio output timing data 51. In this case, one of the received normal audio data 52 and error audio data 53 is output. In this manner, since the period T2 set in the audio output timing data 51 is decided in accordance with the output period T1 of the audio guidance to be output in the print instruction processing, the computer and printer can output the audio guidances in a coordinated manner without overlap.

Figure 6:
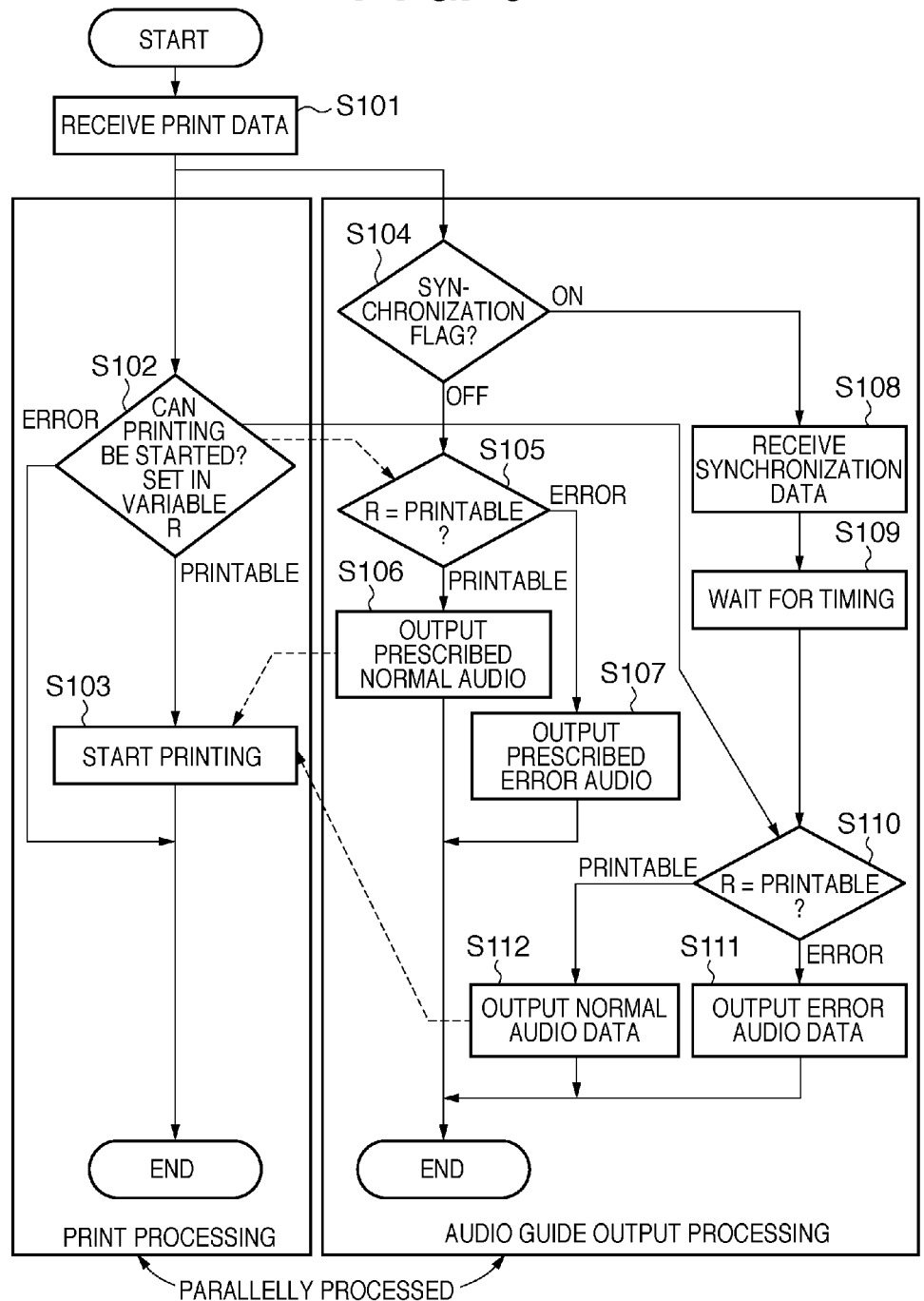
FIG. 6 is a flowchart showing the operation of a printer 20.

Processing in the printer will be described below. FIG. 6 shows processes executed by the printer 20 upon reception of a print instruction from the computer 22. These processes are executed under the control of the control unit 201.

In step S101, the communication unit 203 receives the print data transmitted from the computer. After that, the control unit 201 controls to parallelly execute print processing S20 and audio guide output processing S30.

In the print processing S20, the following processes are executed.

The control unit 201 confirms in step S102 if print processing is ready. When the print unit 204 does not include any ink cartridge or any paper sheets, it is determined that the print processing is not ready. If the print processing is ready, the control unit 201 sets "printable" in a variable R; otherwise, it sets "error" in the variable R.

If "error" is set in step S102, the print processing ends. If "printable" is set, the control unit 201 executes print processing of image data included in the print data in step S103. The image print processing in step S103 is preferably started after a normal audio guidance is output in step S106 or S112 to be described later. If the control unit 201 confirms that the print unit 204 has finished the print execution processing, the print processing ends.

In the audio guide output processing S30, the following processes are executed.

The control unit 201 judges in step S104 whether the synchronization flag 45 included in the print data 40 is "ON" or "OFF. If the synchronization flag 45 is "ON" ("ON" in step S104), the process advances to step S108; if the synchronization flag 45 is "OFF" ("OFF" in step S104), the process advances to step S105. In the case of print execution processing, this synchronization flag is normally "ON". However, this embodiment explains the audio guide output processing including conditional branches in consideration of common processes to be flexibly coped with depending on event types and connected devices.

In step S105, the control unit 201 checks the value of the variable R. This variable is set in step S103 in the print execution processing S20 which is being executed parallelly. At this time, if the variable is not set yet, the control unit 201 checks the value after it waits until the value is set. If the variable R is "printable", the control unit 201 controls the process to advance to step S106; if the variable R is "error", it controls the process to advance to step S107.

In step S106, the control unit 201 reads out sampling audio data which is recorded in advance in the storage unit 206 and is used for normal print execution processing, and supplies it to the audio output unit 202. Then, the audio output unit 202 outputs an audio guidance according to the sampling audio data used for the normal print execution processing.

In step S107, the control unit 201 reads out sampling audio data which is recorded in advance in the storage unit 206 and is used for a print execution processing error, and supplies it to the audio output unit 202. Then, the audio output unit 202 outputs an audio guidance according to the sampling audio data used for the print execution processing error.

If the synchronization flag 45 is "ON", the communication unit 203 receives the audio guidance synchronization data from the computer 22 in step S108. The control unit 201 recognizes the reception timing of the audio guidance synchronization data as the reception timing RT of the audio guidance synchronization data, and activates a timer (not shown) to start to count an elapsed time period from the timing RT.

In step S109, the control unit 201 waits for a time period T2 (seconds) described in the audio output timing data 51 in the audio guidance synchronization data without starting to output audio data included in the audio guidance synchronization data. That is, the control unit 201 waits until the elapsed time period counted by the timer becomes equal to the period T2 of the audio output timing data 51 included in the audio guidance synchronization data. If the elapsed time period counted by the timer becomes equal to the period T2 (seconds) described in the audio output timing data 51, the process advances to step S110.

In step S110, the control unit 201 checks the value of the variable R. This variable is set in step S103 in the print execution processing S20 which is being executed parallelly. If the variable R is "printable", the process advances to step S112; if the variable R is "error", the process advances to step S111.

In step S112, the control unit 201 supplies the normal audio data 52 to the audio output unit 202 so as to start to output audio data of the normal audio data 52 included in the audio guidance synchronization data 50, and the audio output unit 202 outputs an audio guidance corresponding to the normal audio data 52.

In step S111, the control unit 201 supplies the error audio data 53 to the audio output unit 202 so as to start to output audio data of the error audio data 53 included in the audio guidance synchronization data 50, and the audio output unit 202 outputs an audio guidance corresponding to the error audio data 53.

In this manner, an audio guidance of the print execution processing in the printer begins to be output at a timing OT after an elapse of the elapsed time period T2 according to the output time period T1 of an audio guidance of the print instruction processing in the computer since the reception timing RT of the audio guidance synchronization data by the printer 20. Then, the printer can output an audio guidance related to the print execution processing at the timing OT synchronized with the finished timing CT of an audio guidance related to the print instruction processing. That is, when the plurality of devices (computer 22 and printer 20) executes a series of processes including the print instruction processing and print execution processing in a coordinated manner, the output order of audio guidances can correspond to that of processes in the series of processes. Also, audio guidances related to respective processes included in the series of processes can be controlled to be output according to an order of processes in the series of processes at non-overlapping timings to have non-overlapping contents. Such control can be implemented without using any additional control device other than the devices which actually execute the processes. In this way, when the plurality of devices executes the series of processes in a coordinate manner, the user can easily recognize audio guidances while avoiding the degrees of freedom in installation of devices from lowering.

Note that in this embodiment, as for the normal audio data 52 and error audio data 53 in the audio guidance synchronization data, sampling data generated by the computer 22 are transmitted. This is because the computer can more easily update data than the printer. At the same time, when the computer dynamically generates and outputs an audio guidance according to the contents of a user's print instruction, such complicated processing is more likely to be executed on the computer side. The computer includes a large-capacity recording device, while the printer normally includes a small-capacity storage device. For this reason, when the computer stores data of a plurality of audio guidances and transmits only required audio data of these data to the printer, the printer can reproduce the plurality of audio guidances without increasing the capacity of its storage device.

In this embodiment, the audio output timing data and audio data are simultaneously transmitted from the computer as the audio guidance synchronization data, but they may be transmitted independently. At this time, audio data is transmitted first, and information required to identify the audio data to be reproduced and audio output timing data indicating the reproduction timing of that audio data are then transmitted as audio guidance synchronization data, thus reducing the data size of the audio guidance synchronization data, and eliminating problems caused upon transmitting the audio guidance synchronization data. Also, since the audio data is transmitted first, the printer can prepare for audio guidance reproduction in advance.

In this embodiment, the computer starts to reproduce an audio guidance as soon as transmission of the synchronization data is finished. Alternatively, the computer may start to reproduce an audio guidance after transmission of the synchronization data is finished, and the computer receives synchronization data reception finishing information from the printer. In this case, it is desirable to set the period T2 to be slightly longer than the period T1 so as to prevent audio guidances of the computer and printer from overlapping each other.

In this embodiment, the printer waits for the period T2 in step S109, and then executes the checking process in step S110 to decide whether or not to reproduce an audio guidance. Alternatively, whether or not to reproduce an audio guidance may be checked during the waiting period in step S109. If it is decided that an audio guidance is to be reproduced, preparation processing required to reproduce the audio guidance is preferably executed by reading out audio data of the audio guidance to be reproduced during the waiting period T2 in step S109. With this preparation processing, the printer can begin to reproduce the audio guidance immediately after an elapse of the period T2.

As another embodiment, the following method is available. As for the normal audio data 52 and error audio data 53 in the audio guidance synchronization data, management IDs of audio data, which are generated and recorded in the storage unit 206 in advance on the printer 20 side, may be used. That is, the storage unit 206 of the printer 20 may store list information which associates a plurality of first audio data and a plurality of identifiers used to identify the respective first audio data with each other.

For example, a case will be examined below wherein when the plurality of devices execute the series of processes in a coordinated manner, the storage unit 206 of the printer 20 stores the list information. In this case, in step S602 shown in FIG. 5, the control unit 221 generates audio guidance synchronization data 50 to include an identifier required to designate audio data, and supplies the generated data to the communication unit 223. The communication unit 223 of the computer 22 transmits the supplied audio guidance synchronization data 50 to the printer 20 via the communication cable 21. In step S108, the communication unit 203 of the printer 20 receives the audio guidance synchronization data 50 including the identifier. In step S112, the control unit 201 accesses the storage unit 206 to refer to the list information, thereby identifying audio data corresponding to the identifier included in the audio guidance synchronization data 50. The control unit 201 supplies the identified audio data to the audio output unit 202. The audio output unit 202 outputs an audio guidance based on the contents according to the audio data. That is, the audio output unit 202 outputs a second audio guidance based on the contents according to first audio data, which is identified according to the identifier included in the audio guidance synchronization data 50 received by the communication unit 203 and the list information stored in the storage unit 206. In this way, the reception device side can store audio data.

In this embodiment, the time period (seconds) for which the control waits in step S109 on the printer 20 side without any processing is set in the audio output timing data 51 in the audio guidance synchronization data. However, depending on the types of computers and printers, time periods required to, for example, exchange data may often be largely different. In this case, when a constant time period is designated, an audio guidance may not be reproduced at an intended timing.

In order to avoid such problem, as another embodiment, the following method is available. In the audio guidance synchronization data, an event indicating finishing of the print instruction processing may be designated as a trigger used to output an audio guidance of the print execution processing. For example, an event indicating reproduction start of an audio guidance of the print execution processing on the printer 20 side is set in the audio output timing data 51 as an event indicating finishing of the print instruction processing. In this case, in step S109 shown in FIG. 6, the control unit 201 waits until an event which matches the event designated by the instruction included in the audio guidance synchronization data is generated. That is, the control unit 201 waits without any processing until it receives print instruction processing finishing information from the computer. When the control unit 201 detects that an event which matches the event designated by the instruction included in the audio guidance synchronization data is generated, that is, the print instruction processing finishing information is received from the computer, it controls the process to advance to step S110. In step S112 or S111, the audio output unit 202 of the printer 20 reproduces the normal or error audio data included in the audio guidance synchronization data received from the computer before the print instruction processing finishing information is received, thus outputting an audio guidance. In this manner, an audio guidance is output in response to, as a trigger, generation of an event that matches the event designated by the instruction included in the audio guidance synchronization data. In this way, the output timing of an audio guidance can be designated by the event generation timing in place of an elapse of the time period. As the event to be set, an event which informs finishing of processing and is to be transmitted from the computer to the printer is used, thus starting reproduction of the audio guidance of the next processing in the printer in response to finishing of that processing in the computer.

Audio guidances at the time of ink exchange processing and inks setting processing will be described below.

Figure 8:
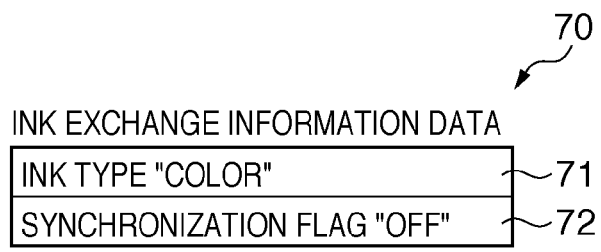
FIG. 8 is a view showing the configuration of ink exchange information data.

The configuration of ink exchange information data, which is transmitted from the printer 20 to the computer 22 when the user exchanges the ink cartridge 207 in the printer 20 will be described below with reference to FIG. 8.

Ink exchange information data 70 has ink type data 71 and a synchronization flag 72. The ink type data 71 is data indicating a newly set ink type in the form of a management ID on the printer 20. FIG. 8 exemplifies a case in which the ink type data 71 includes a management ID "color" indicating a color ink type. The synchronization flag 72 is data used to set a flag indicating whether or not the computer 22 outputs an audio guidance in synchronism with the printer 20. In FIG. 8, the synchronization flag 72 is set "OFF" to indicate that the computer 22 does not output an audio guidance in synchronism with the printer 20. Note that the synchronization flag 72 is set "ON" when the computer 22 outputs an audio guidance in synchronism with the printer 20.

Operations of the respective devices when the plurality of devices (printer 20 and computer 22) executes a series of processes (ink exchange processing and ink setting processing) in a coordinated manner will be described below.

Figure 9:
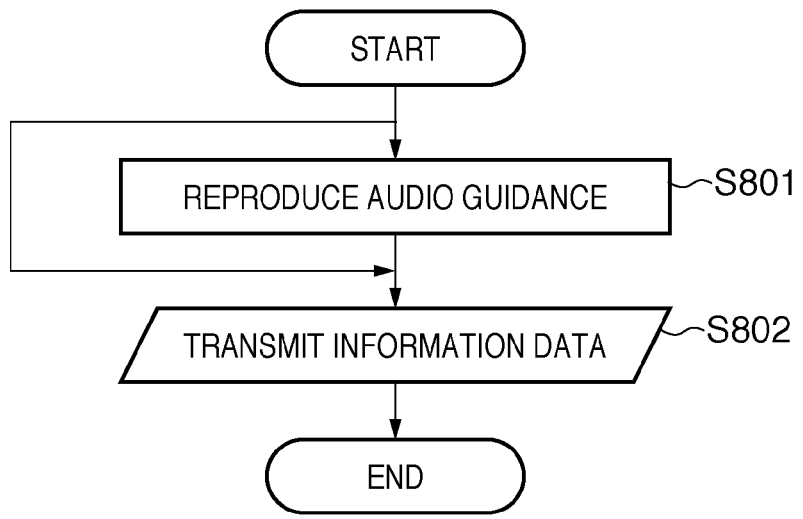
FIG. 9 is a flowchart showing the operation of the printer 20.

FIG. 9 shows the operations executed by the printer 20 when the user exchanges the ink cartridge 207 in the printer 20.

In step S801, the audio output unit 202 of the printer 20 outputs an audio guidance related to the ink exchange processing. This audio guidance of the ink exchange processing is selected from, for example, a plurality of sampling audio data, which are generated and recorded in the storage unit 206 in advance so as to be output upon exchanging the ink cartridge. In this embodiment, the audio guidance to be output is "ink is exchanged".

Upon finishing of the output operation of the audio guidance of the ink exchange processing, the communication unit 203 of the printer 20 generates ink exchange information data and transmits it to the computer 22 in step S802. In other words, the communication unit 203 of the printer 20 transmits the ink exchange information data 70 to the computer 22 at an output finishing timing CT' of the audio guidance of the ink exchange processing. In this case, in the ink type data 71, the type of an ink cartridge set in the printer 20 at that time is set. In this example, the synchronization flag 72 is always set "OFF", so as to instruct the computer 22 to output an audio guidance without being synchronized with the printer 20.

In this case, since the ink exchange information data 70 is transmitted at the output finishing timing CT' of the audio guidance of the ink exchange processing, the audio guidance of the ink exchange processing and that of the ink setting processing are never output during an identical period without any synchronization. That is, the ink exchange information data also serves as an instruction required to output an audio guidance to be output, which is related to the ink setting processing, at a timing synchronized with finishing of the output operation of the audio guidance related to the ink exchange processing.

Figure 10:
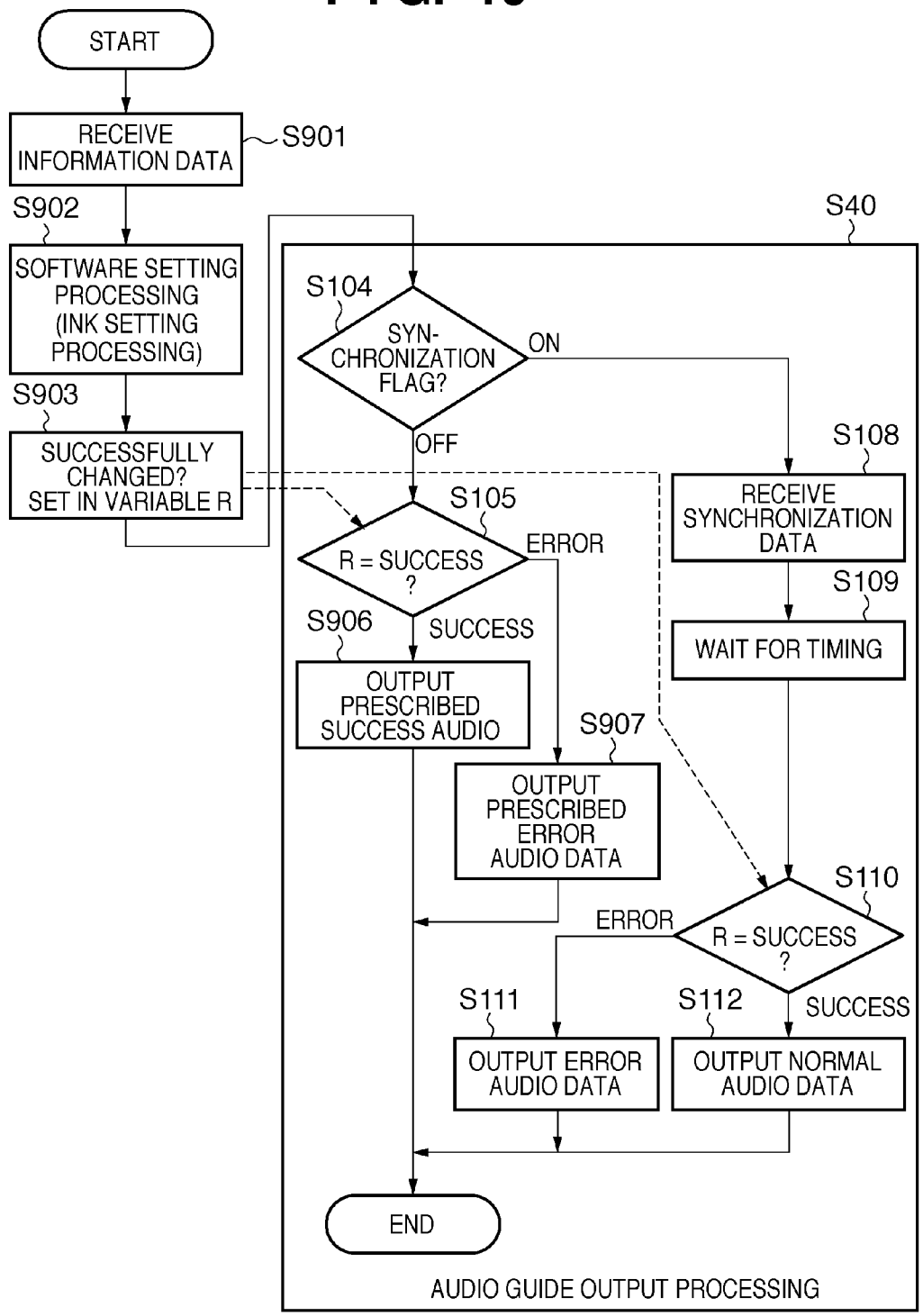
FIG. 10 is a flowchart showing the operation of the computer 22.
Figure 11:
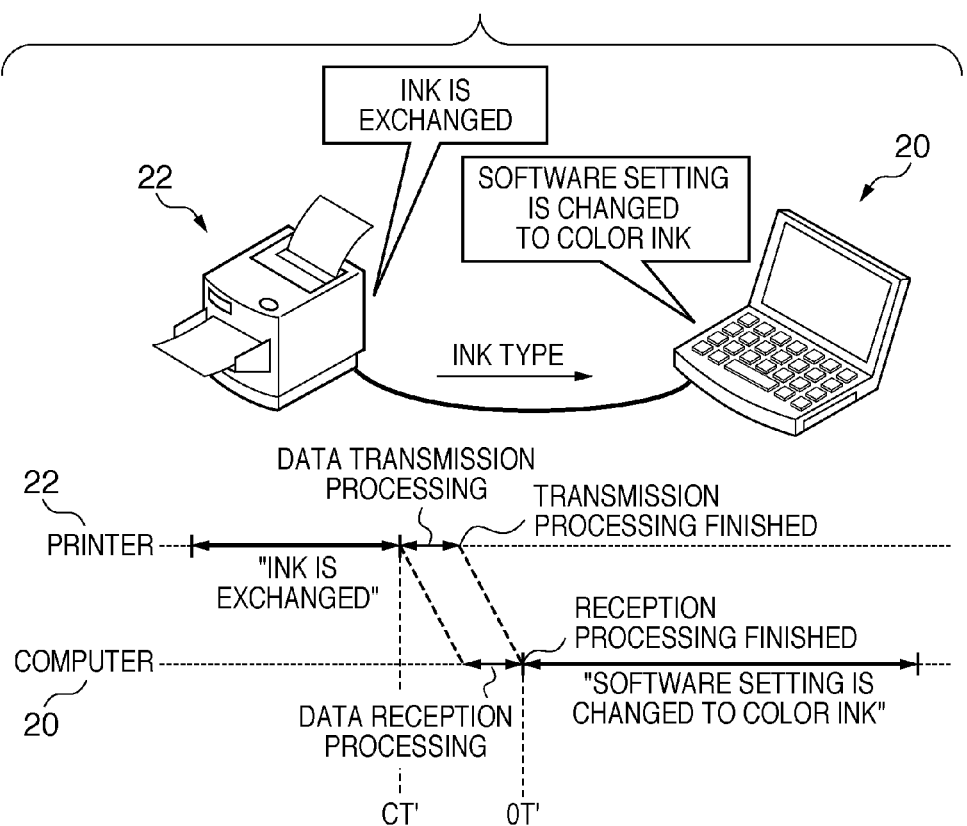
FIG. 11 is a view showing synchronization of audio guidances.

FIG. 10 shows the operations executed by the computer 22 when the computer 22 is informed of data indicating that ink cartridge 207 was exchanged in the printer 20.

In step S901, the communication unit 223 of the computer 22 receives the ink exchange information data 70 transmitted from the printer 20, and supplies it to the control unit 221.

In step S902, the control unit 221 of the computer 22 executes the ink setting processing. More specifically, the control unit 221 changes the setting of active software, that is, the list box 301 on the print window 300 shown in FIG. 2 in accordance with the ink type data 71 in the ink exchange information data 70.

The control unit 221 checks in step S903 if the software setting change processing, that is, the ink setting processing has succeeded. If the ink setting processing has succeeded, the control unit 221 sets "success" in a variable R. If the ink setting processing has failed, the control unit 221 sets "error" in the variable R. After that, the control unit 221 executes audio guide output processing S40.

The audio guide output processing S40 is basically the same as the audio guide output processing S30 shown in FIG. 6 except for the following processes.

In step S906, the control unit 221 supplies sampling audio data, which is generated and recorded in the storage unit 226 in advance, and is used when the processing has succeeded, to the audio output unit 222. Thus, the audio output unit 222 outputs an audio guidance of the ink setting processing according to that sampling audio data. The audio guidance of the ink setting processing is that related to the ink setting processing. The audio guidance of the ink setting processing is, for example, "software setting is changed to color ink".

In step S907, the control unit 221 supplies sampling audio data, which is generated and recorded in the storage unit 226 in advance, and is used when an error has occurred in the processing, to the audio output unit 222. Thus, the audio output unit 222 outputs an audio guidance according to that sampling audio data.

In this way, the ink exchange information data is supplied from the printer 20 to the computer 22 at the output finishing timing CT' of the audio guidance of the ink exchange processing, and the computer 22 outputs a second audio guidance at a reception finishing timing OT' of that data. In this way, the audio guidance related to the ink setting processing can be output at the timing OT' synchronized with the finishing timing CT' of the audio guidance related to the ink exchange processing. That is, when the plurality of devices (printer 20 and computer 22) executes the series of processes (ink exchange processing and ink setting processing) in a coordinated manner, the output order of audio guidances can correspond to that of processes in the series of processes. For example, after the audio guidance "ink is exchanged" of the ink exchange processing is finished, the audio guidance "software setting is changed to color ink" of the ink setting processing can be output. That is, audio guidances related to respective processes included in the series of processes can be controlled to be output according to the order of processes in the series of processes at non-overlapping timings to have non-overlapping contents. Such control can be implemented without using any additional control device other than the devices which actually execute the processes. In this way, when the plurality of devices execute the series of processes in a coordinated manner, the user can easily recognize audio guidances while avoiding the degrees of freedom in installation of devices from lowering.

As described above, according to this embodiment, when the printer and computer, which can respectively output audio guidances, are connected and used, and execute the series of coordinated processes, they can output audio guidances without overlap. That is, when a plurality of devices, which can output audio guidances, is connected and used, it can output the audio guidances without overlap, and the user can easily understand the contents of the audio guidances. That is, since the user can intuitively understand that the plurality of devices operates in a coordinated manner, he or she can ultimately use, at ease, even the complicated coordinated processing attained by connecting the plurality of devices.

In this embodiment, data is transmitted from the computer to the printer and vice versa, that is, the data transmission direction is switched in two ways according to contents of a series of processes. More specifically, a control unit of at least one device in a plurality of devices assigns a transmission device and reception device to the plurality of devices according to the type of series of processes. That is, a control unit of a device which includes an operation unit that accepts a user's operation assigns the device including the operation unit that accepts a user's operation to a transmission device, and assigns a device which includes an operation unit that does not accept any user's operation to a reception device in accordance with the type of series of processes. In this way, the roles of the transmission and reception devices can be appropriately switched without being fixed according to the contents of processes. When a device at which the user made an operation outputs an audio guidance first, and a device at which the user did not make any operation outputs an audio guidance later, the user can easily understand that the user's operation is transmitted to the other device.

<Second Embodiment>

Figure 12:
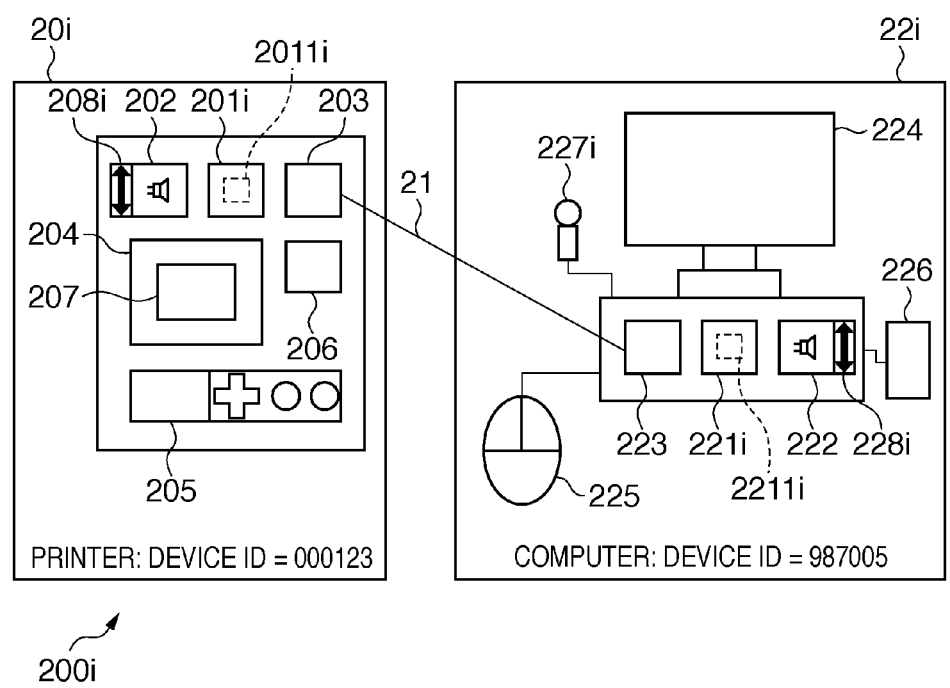
FIG. 12 is a block diagram showing the arrangement of a system 200$i$ according to the second embodiment.

A system 200*i* according to the second embodiment of the present invention will be described below. The system of the second embodiment has basically the same arrangement as in the first embodiment, and can execute the processing of the first embodiment. Differences from the first embodiment will be described mainly below. FIG. 12 is a block diagram showing the arrangement of the system 200*i* according to the second embodiment.

The system 200*i* includes, for example, a printer 20*i* and computer 22*i*. In this case, unique device IDs are assigned to all devices included in the system 200*i*. As shown in FIG. 12, for example, a device ID=000123 is assigned to the printer 20*i*, and a device ID=987005 is assigned to the computer 22*i*.

The printer 20*i* has a control unit 201*i* and tone volume operation unit 208*i*. The tone volume operation unit 208*i* changes the tone volume reference level of an audio output unit 202. The control unit 201*i* includes a tone volume matching unit 2011*i*. The tone volume matching unit 2011*i* controls the tone volume operation unit 208*i* to change the tone volume reference level of the audio output unit 202 to a level that matches the tone volume reference level of an audio output unit 222 in the other device.

The computer 22*i* has a control unit 221*i*, tone volume operation unit 228*i*, and tone volume measurement unit 227*i*. The tone volume operation unit 228*i* changes the tone volume reference level of the audio output unit 222. The control unit 221*i* includes a tone volume matching unit 2211*i*. The tone volume matching unit 2211*i* controls the tone volume operation unit 228*i* to change the tone volume reference level of the audio output unit 222 to a level that matches the tone volume reference level of the audio output unit 202 in the other device. The tone volume measurement unit 227*i* is configured to be detachable from the main body of the computer 22*i*. The tone volume measurement unit 227*i* includes, for example, a detachable microphone. When the tone volume measurement unit 227*i* is connected to the main body of the computer 22*i*, it fetches an audio around the main body, and measures the tone volume of that audio. The tone volume measurement unit 227*i* supplies the measurement result to the control unit 221*i*.

The control unit 221*i* can execute predetermined processing according to that measurement result.

FIG. 13 shows operations in the computer 22*i* when the computer 22*i* and printer 20*i* are connected to be able to communicate with each other.

In step S301, a communication unit 223 of the computer 22*i* detects that the printer 20*i* is connected to the computer 22*i* to be able to communicate with each other. More specifically, the communication unit 223 sends, to the printer 20*i*, an inquiry about a device ID of the printer 20*i* via a communication cable 21. In response to this inquiry, a communication unit 203 of the printer 20*i* returns the device ID of the printer 20*i* to the computer 22*i* via the communication cable 21. The communication unit 223 of the computer 22*i* receives the device ID of the printer 20*i* via the communication cable 21, and supplies it to the control unit 221*i*. Thus, the control unit 221*i* of the computer 22*i* acquires the device ID of the connected printer from the printer 20*i* as a connection destination device.

The control unit 221*i* of the computer 22*i* searches in step S302 whether or not setting information corresponding to the acquired device ID is recorded in a storage unit 226. If the setting information corresponding to the acquired device ID is recorded ("recorded" in step S302), the control unit 221*i* controls the process to advance to step S303; if the setting information corresponding to the acquired device ID is not recorded ("not recorded" in step S302), it controls the process to advance to step S304.

In step S303, the control unit 221*i* executes tone volume matching processing according to the setting information corresponding to the acquired device ID.

More specifically, the tone volume matching unit 2211*i* of the control unit 221*i* acquires the setting information corresponding to the device ID recorded in the storage unit 226 as information indicating a tone volume reference level of the audio output unit 202 of the printer 20*i*. That is, the tone volume matching unit 2211*i* of the computer 22*i* acquires the tone volume reference level of the audio output unit 202 of the printer 20*i* detected in step S301.

The tone volume matching unit 2211*i* controls the tone volume operation unit 228*i* to change the tone volume reference level of the audio output unit 222 of the computer 22*i* to a level that matches the acquired tone volume reference level of the audio output unit 202 of the printer 20*i*.

Note that details of the tone volume matching processing executed in step S303 will be described later.

In step S304, the control unit 221*i* of the computer 22*i* displays a setting dialog "tone volume matching manager" 500 on a display 224, and prompts the user to select tone volume matching setting information. An operation unit 225 of the computer 22*i* accepts the selection of the user, and supplies it to the control unit 221*i*. The control unit 221*i* executes tone volume matching processing according to the supplied selection. Note that details of the setting dialog "tone volume matching manager" 500 will be described later.

In step S305, the control unit 221*i* records the setting information according to the selection accepted via the displayed setting dialog in the storage unit 226, so as to be used at the time of next connection. After that, the control unit 221*i* ends the processing.

FIG. 14 shows an example of setting information recorded in the storage unit 226 of the computer 22*i*.

The setting information has a device ID setting 41, matched tone volume setting 42, priority device setting 43, and mute priority setting 44. The device ID setting 41 records, as a device ID, a device to which the computer 22*i* is connected to use this setting. The matched tone volume setting 42 records tone volume reference levels of respective devices when the computer 22*i* and the device recorded in the device ID setting 41 perform a tone volume matching setting operation. The tone volume reference level is recorded as a ratio when the maximum tone volume of each device is defined by 100%. The priority device setting 43 and mute priority setting 44 record a matching setting selected by the user when the computer 22*i* and the device recorded in the device ID setting 41 perform the tone volume matching setting operation. More specifically, the priority device setting 43 records a device whose tone volume is preferentially used to execute the tone volume matching operation. The mute priority setting 44 records whether or not both devices are muted when a mute setting of one of these devices is valid. The mute setting is used to temporarily mute the tone volume of an audio output unit.

Figure 15:
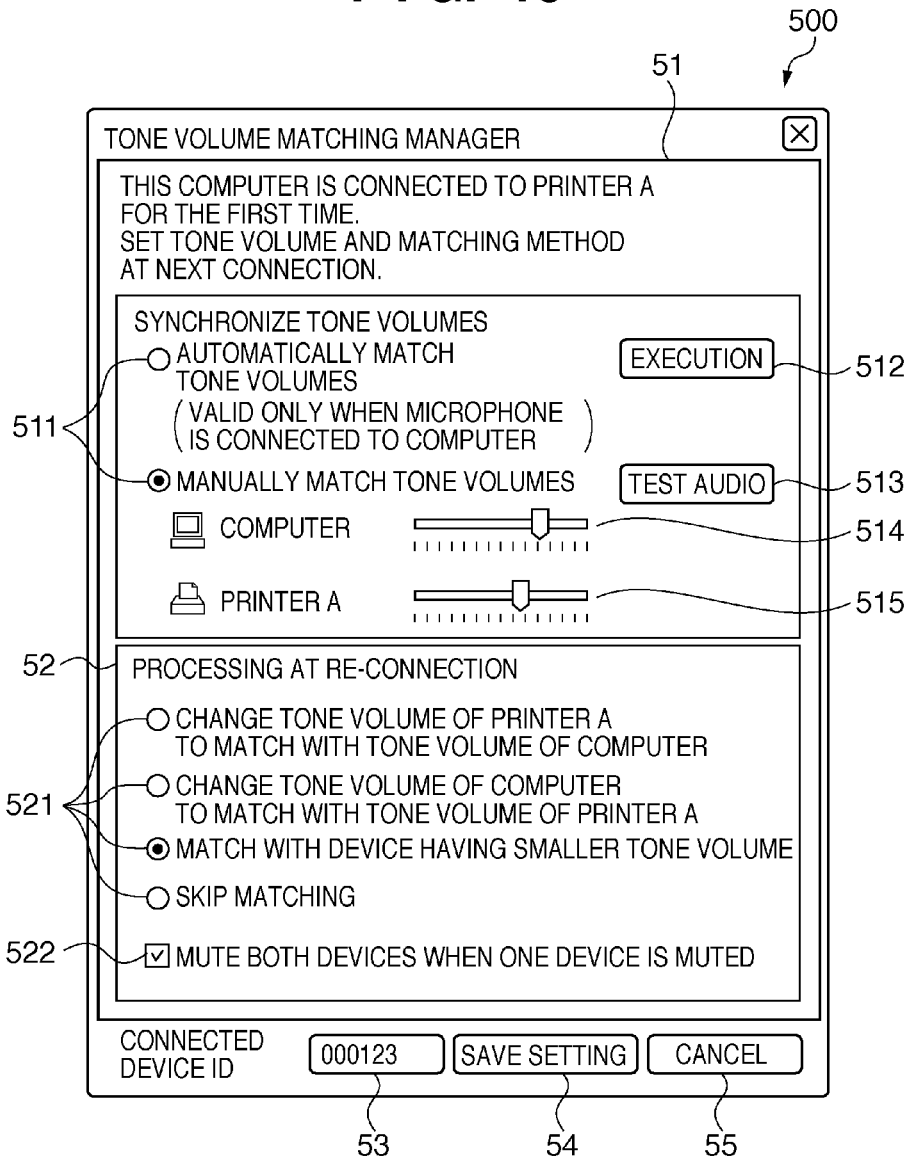
FIG. 15 is a view showing a setting dialog.

FIG. 15 shows the setting dialog "tone volume matching manager" 500 displayed on the display 224 of the computer 22*i* in step S304 shown in FIG. 13.

The setting dialog "tone volume matching manager" 500 has a tone volume setting area 51, re-connection setting area 52, device ID display box 53, setting reflection button 54, and cancel button 55. The tone volume setting area 51 is used to set tone volume reference levels of respective devices upon matching. The re-connection setting area 52 is used to set a device, a tone volume reference level of which is to be prioritized at the time of re-connection. The device ID display box 53 displays the device ID of the connected device. The setting reflection button 54 is used to save setting information in the storage unit 226. The cancel button 55 is used to close the setting dialog "tone volume matching manager" 500 on the display 224.

The tone volume setting area 51 has radio buttons 511, an execution button 512, test audio button 513, computer tone volume slider 514, and printer tone volume slider 515. The radio buttons 511 are used to select whether the tone volume reference levels are automatically determined or manually set. The execution button 512 is used when the tone volume reference levels are automatically set. The test audio button 513 is used when the tone volume reference levels are manually set. The computer tone volume slider 514 indicates the current tone volume reference level of the computer. The printer tone volume slider 515 indicates the current tone volume reference level of the printer.

When the tone volume measurement unit 227*i* is connected to the main body of the computer 22*i*, the radio buttons 511 allow the user to select one of an automatic determination mode "automatically match tone volumes" and a manual setting mode "manually match tone volumes". On the other hand, when the tone volume measurement unit 227*i* is not connected to the main body of the computer 22*i*, the radio buttons 511 allow the user to select only the manual setting mode "manually match tone volumes". When the user selects the automatic determination mode using the radio buttons 511, the execution button 512 is validated, but the test audio button 513, computer tone volume slider 514, and printer tone volume slider 515 are invalidated not to accept any user's operation. Conversely, when the user selects the manual setting mode using the radio buttons 511, the test audio button 513, computer tone volume slider 514, and printer tone volume slider 515 are validated, but the execution button 512 is invalidated not to accept any user's operation.

When the user clicks the execution button 512, the tone volume reference level of the audio output unit in the computer 22*i* and that of the audio output unit in the printer 20*i* are automatically matched using audio inputs from the tone volume measurement unit 227*i*. More specifically, after the computer 22*i* is designated to output an audio guidance, the tone volume measurement unit 227*i* measures the tone volume of the audio guidance output from the audio output unit. Likewise, the printer 20*i* is also controlled to output an audio guidance, and the tone volume of that audio guidance is measured using the tone volume measurement unit 227*i*. The tone volume reference levels of the two devices, which are measured in this way, are compared, and the tone volume of the device having the smaller reference level is increased or that of the device having the larger reference level is decreased. After that, the tone volume reference levels of audio guidances output from the two devices are measured again. This processing is repeated until the measured tone volume reference levels of the two devices match (for example, the two reference levels are nearly the same), thereby automatically matching the tone volumes of the computer 22*i* and printer 20*i*.

When the user clicks the test audio button 513, an audio guidance output request is issued to the computer 22*i* first, and is then issued to the printer 20*i*. When the user moves the computer tone volume slider 514 and printer tone volume slider 515, these operations respectively instruct the tone volume operation unit 228*i* of the computer 22*i* and the tone volume operation unit 208*i* of the printer 20*i* to set tone volumes according to the slider values. When the user manually performs a tone volume matching setting operation, he or she moves the computer tone volume slider 514 and printer tone volume slider 515, and then clicks the test audio button 513. Then, the user repeats this operation until he or she judges that the tone volume reference levels of audio guidances as a result of clicking the test audio button 513 have matched (for example, the two reference levels are the same).

When the tone volume reference level on the printer 20*i* side is changed by, for example, a user's operation at an operation unit 205, and the computer 22*i* is informed of that change, the printer tone volume slider 515 performs the following operation. The printer tone volume slider 515 automatically moves to a position according to the tone volume reference level of the printer 20*i* at that time.

The re-connection setting area 52 has priority device setting radio buttons 521 and a mute priority setting check box 522. The priority device setting radio buttons 521 allow the user to select one of four choices, that is, to prioritize the computer 22*i*, to prioritize the printer 20*i*, to prioritize a device having a smaller tone volume, and to skip matching. That is, the operation unit 225 accepts a priority setting operation which designates one of a plurality of devices whose tone volume setting is to be prioritized via the priority device setting radio buttons 521. The mute priority setting check box 522 validates a mute setting when it is checked, and invalidates a mute setting when it is unchecked. That is, the operation unit 225 accepts a mute setting operation via the mute priority setting check box 522.

The device ID display box 53 displays the device ID of the connected device. The device ID is automatically displayed at the time of connection, and cannot be changed by the user.

When the user clicks the setting reflection button 54, the setting values displayed on the dialog are recorded in the storage unit 226 of the computer 22*i* as the setting information shown in FIG. 14. More specifically, the contents displayed in the device ID display box 53 are set in the device ID setting 41. In the matched tone volume setting 42, values (tone volume reference levels) set on the computer tone volume slider 514 and printer tone volume slider 515 are set. In the priority device setting 43, a value selected by the corresponding priority device setting radio button 521 is saved. In the mute priority setting 44, a value of the mute priority setting check box 522 is saved.

Figure 16:
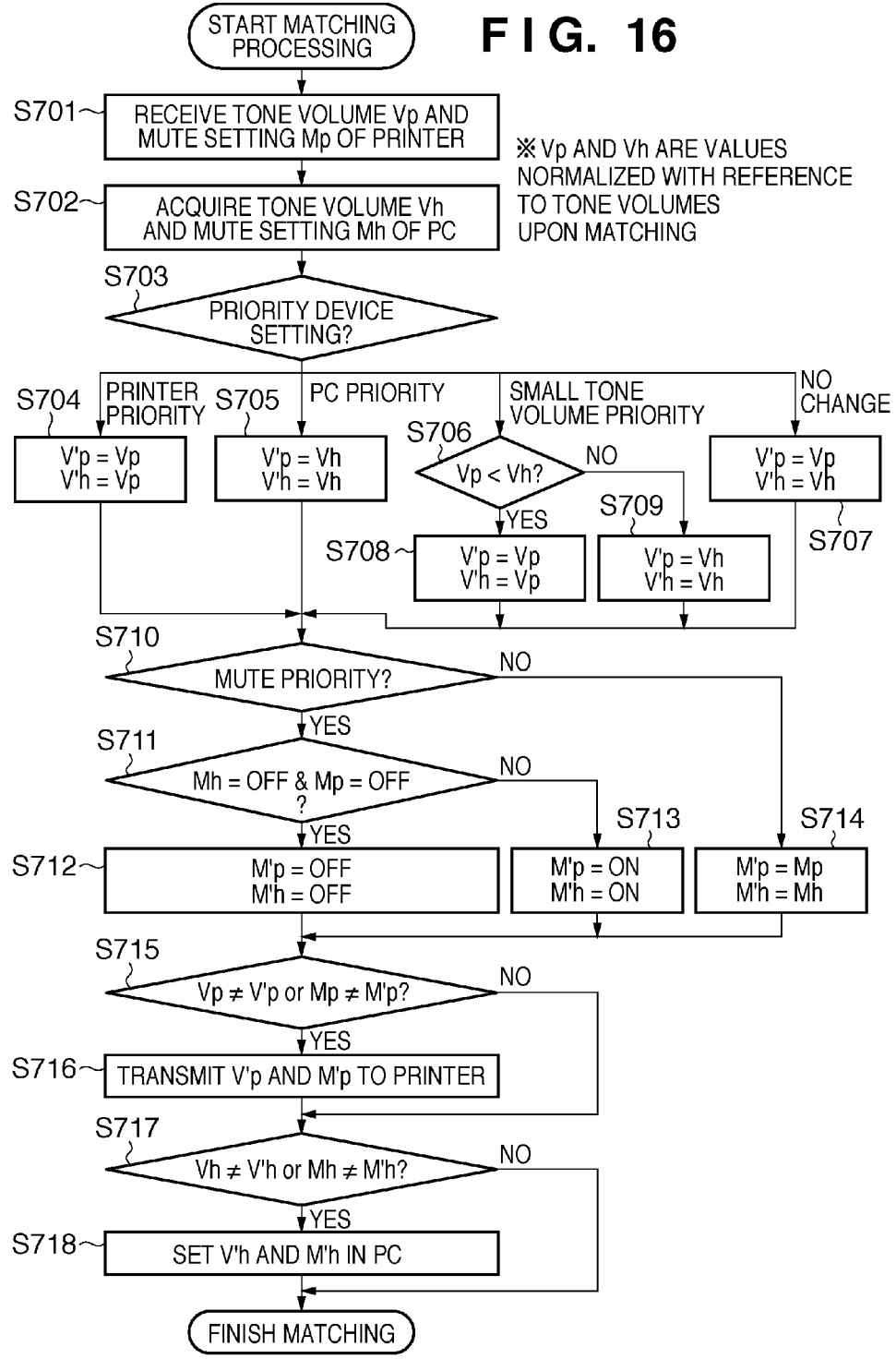
FIG. 16 is a flowchart showing details of tone volume matching processing.

FIG. 16 shows details of the tone volume matching processing executed in step S303 shown in FIG. 13.

In step S701, the communication unit 223 of the computer 22*i* receives values Vp and Mp from the printer 20*i*. The value Vp indicates the tone volume reference level of the audio output unit 202 in the printer 20*i* at the time of connection. The value Mp indicates the validity/invalidity of a mute setting for the audio output unit 202 in the printer 20*i* at the time of connection. The mute setting is used to temporarily mute the tone volume of the audio output unit 202. The communication unit 223 supplies the received values Vp and Mp to the tone volume matching unit 2211*i* of the control unit 221*i*.

In step S702, the tone volume matching unit 2211*i* of the control unit 221*i* acquires values Vh and Mh. The value Vh indicates the tone volume reference level of the audio output unit 222 in the computer 22*i*. The value Mh indicates the validity/invalidity of a mute setting.

The values Vp and Vh are obtained by normalizing values indicating the percentages of the current tone volume reference levels of the respective devices to their maximum tone volumes using the matched tone volume setting 42 of the settings corresponding to the acquired device ID, which have been described using FIG. 14. For example, assume that the tone volumes at the time of matching are 80% for the printer 20*i* and 40% for the computer 22*i*. Also, if the current tone volume of the printer 20*i* is 64% and that of the computer 22*i* is 30%, Vp=64÷80=0.8, and Vh=30÷40=0.75.

In step S703, the tone volume matching unit 2211*i* of the control unit 221*i* acquires the priority device setting 43 of the settings corresponding to the acquired device ID, which have been described using FIG. 14. The tone volume matching unit 2211*i* switches processes according to that setting, and decides a tone volume reference level V'p of the audio output unit 202 in the printer 20*i* after matching and a tone volume reference level V'h of the audio output unit 222 in the computer 22*i* after matching.

If the priority device setting 43 is set to prioritize the printer in step S703 ("printer priority" in step S703), the tone volume matching unit 2211*i* controls the process to advance to step S704. In step S704, the tone volume matching unit 2211*i* prioritizes the printer tone volume Vp before matching, and sets Vp as both V'p and V'h. Then, the process advances to step S710.

If the priority device setting 43 is set to prioritize the computer in step S703 ("PC priority" in step S703), the tone volume matching unit 2211*i* controls the process to advance to step S705. In step S705, the tone volume matching unit 2211*i* prioritizes the computer tone volume Vh before matching, and sets Vh as both V'p and V'h. Then, the process advances to step S710.

If the priority device setting 43 is set to prioritize a device having a smaller tone volume in step S703 ("small tone volume priority" in step S703), the tone volume matching unit 2211*i* controls the process to advance to step S706. In step S706, the tone volume matching unit 2211*i* compares the tone volume reference level Vp in the printer and the tone volume reference level Vh in the computer before matching. If Vp<Vh (YES in step S706), the tone volume matching unit 2211*i* controls the process to advance to step S708. In step S708, the tone volume matching unit 2211*i* sets Vp as both V'p and V'h, and then controls the process to advance to step S710. If Vh≤Vp (NO in step S706), the tone volume matching unit 2211*i* controls the process to advance to step S709. In step S709, the tone volume matching unit 2211*i* sets Vh as both V'p and V'h, and then controls the process to advance to step S710. In this way, by matching tone volumes with reference to the device having a smaller tone volume, an audio guidance can be prevented from being output with an unexpectedly large tone volume.

If the priority device setting 43 is set to skip matching in step S703 ("not change" in step S703), the tone volume matching unit 2211i controls the process to advance to step S707. In step S707, the tone volume matching unit 2211i sets Vp as V'p and Vh as V'h, and then controls the process to advance to step S710.

In step S710, the tone volume matching unit 2211i acquires the mute priority setting 44 of the settings corresponding to the acquired device ID, which have been described using FIG. 14, and switches processes according to that setting. Then, the tone volume matching unit 2211i decides a mute setting M'p of the printer 20i after matching, and a mute setting M'h of the computer 22i after matching.

If the mute priority setting 44 is set to prioritize a mute setting in step S710 (YES in step S710), the tone volume matching unit 2211i controls the process to advance to step S711. The tone volume matching unit 2211i checks the values of the printer mute setting Mp and computer mute setting Mh before matching. If both the values are OFF (YES in step S711), the tone volume matching unit 2211i controls the process to advance to step S712. In step S712, the tone volume matching unit 2211i sets OFF in both M'p and M'h, and then controls the process to advance to step S715. If either or both of the values of the printer mute setting Mp and computer mute setting Mh is or are ON (NO in step S711), the tone volume matching unit 2211i controls the process to advance to step S713. In step S713, the tone volume matching unit 2211i sets ON in both M'p and M'h, and then controls the process to advance to step S715.

If the mute priority setting 44 is set not to prioritize any mute setting in step S710 (NO in step S710), the tone volume matching unit 2211i controls the process to advance to step S714. In step S714, the tone volume matching unit 2211i sets the value of the printer mute setting Mp before matching in M'p and that of the computer mute setting Mh before matching in M'h intact, and then controls the process to advance to step S715.

The tone volume matching unit 2211i confirms in step S715 whether or not the tone volume setting and mute setting of the printer 20i are required to be updated. That is, the tone volume matching unit 2211i judges whether or not at least one of first and second conditions is met. The first condition is met when the tone volume reference level Vp in the printer 20i before matching is different from the tone volume reference level V'p in the printer 20i after matching. The second condition is met when the mute setting Mp of the printer 20i before matching is different from the mute setting M'p of the printer 20i after matching.

If at least one of the first and second conditions is met in step S715 (YES in step S715), the tone volume matching unit 2211i controls the process to advance to step S716. In step S716, the tone volume matching unit 2211i supplies the value V'p indicating the tone volume reference level in the printer 20i after matching and the value M'p indicating the mute setting of the printer 20i after matching to the communication unit 223 of the computer 22i. The communication unit 223 of the computer 22i transmits the values V'p and M'p to the printer 20i via the communication cable 21. The communication unit 203 of the printer 20i receives the values V'p and M'p from the computer 22i, and supplies them to the control unit 201i. The tone volume matching unit 2011i of the control unit 201i controls the tone volume operation unit 208i of the printer 20i to change the tone volume reference level of the audio output unit 202 of the printer 20i to a level that matches the received value V'p. That is, the tone volume matching unit 2011i updates the setting information of the tone volume reference level of the audio output unit 202 stored in the storage unit 206 using the received value V'p. Also, the tone volume matching unit 2011i updates the mute setting for the tone volume operation unit 208i of the printer 20i in accordance with the value M'p. That is, the tone volume matching unit 2011i updates the mute setting information for the audio output unit 202 stored in the storage unit 206 using the received value M'p.

If neither the first condition nor the second condition are met in step S715 (NO in step S715), the tone volume matching unit 2211i of the computer 22i controls the process to advance to step S717. That is, when the tone volume reference levels Vp and V'p in the printer 20i before and after matching are equal to each other, and the mute settings Mp and M'p of the printer 20i before and after matching are equal to each other, the settings of the printer 20i need not be changed. Hence, the tone volume matching unit 2211i controls the process to jump to step S717 without any processing.

The tone volume matching unit 2211i confirms in step S717 whether or not the tone volume setting and mute setting of the computer 22i are required to be updated. More specifically, the tone volume matching unit 2211i judges whether or not at least one of third and fourth conditions is met. The third condition is met when the tone volume reference level Vh in the computer 22i before matching is different from the tone volume reference level V'h in the computer 22i after matching. The fourth condition is met when the mute setting Mh of the computer 22i before matching is different from the mute setting M'h of the computer 22i after matching.

If at least one of the third and fourth conditions is met in step S717 (YES in step S717), the tone volume matching unit 2211i controls the process to advance to step S718. In step S718, the tone volume matching unit 2211i controls the tone volume operation unit 228i of the computer 22i to change the tone volume reference level of the audio output unit 222 of the computer 22i to a level that matches the value V'h. That is, the tone volume matching unit 2211i updates the setting information of the tone volume reference level of the audio output unit 222 stored in the storage unit 226 using the value V'h. Also, the tone volume matching unit 2211i updates the mute setting for the tone volume operation unit 228i of the computer 22i in accordance with the value M'h. That is, the tone volume matching unit 2211i updates the mute setting information for the audio output unit 222 stored in the storage unit 226 using the value M'h.

If neither the third condition nor the fourth condition are met in step S717 (NO in step S717), the tone volume matching unit 2211i of the computer 22i ends the processing. That is, when the tone volume reference levels Vh and V'h in the computer 22i before and after matching are equal to each other, and the mute settings Mh and M'h of the computer 22i before and after matching are equal to each other, the settings of the computer 22i need not be changed. Hence, the tone volume matching unit 2211i ends the matching processing without any processing.

An example of a print window 300i as a GUI screen, which is displayed on the display 224 of the computer 22i and is used to instruct the printer 20i to execute the print execution processing will be described below with reference to FIG. 17.

The print window 300i has a print button 60, delete button 61, tone volume setting slider 62, image selection area 63, display button 65, end button 66, and mute setting box 64. The print button 60 is displayed when the computer 22i is connected to the printer 20i, and it is not displayed when the computer 22i is not connected to the printer 20i. The image selection area 63 displays a list of a plurality of representative images indicating a plurality of image files recorded in the storage unit 226, and highlights representative images corresponding to image files selected by the user. FIG. 17 shows a state in which the user selects two representative images 631 and 632.

In this state, when the user clicks the print button 60, the selected image files are printed by the printer 20i. When the user clicks the delete button 61, the selected image files are deleted from the storage unit 226. When the user clicks the display button 65, images according to the selected image files are displayed on the display 224. When the user clicks the end button 66, the print window 300i is closed on the display 224.

When the user operates the tone volume setting slider 62, this operation instructs the tone volume operation unit 228i to change the tone volume reference level of an audio guidance to be output from the audio output unit 222. When the user checks/unchecks the mute setting box 64, this operation instructs the tone volume operation unit 228i to validate/invalidate a mute setting for the audio output unit 222. That is, the operation unit 225 accepts the mute setting operation via the mute setting box 64.

The configuration of tone volume matching data 170 transmitted when the computer 22i instructs the printer 20i to change the tone volume will be described below with reference to FIG. 18.

The tone volume matching data 170 has device ID data 171, tone volume data 172, and mute setting data 173. The device ID data 171 describes a device ID as a tone volume reference level change target of unique IDs assigned to respective devices in the system 200i. The tone volume data 172 describes a numerical value used to set a level, that is, a ratio (%) of the tone volume reference level of the device designated by the device ID data 171 to a maximum tone volume. The mute setting data 173 describes a flag indicating whether or not to validate the mute setting of the device designated by the device ID data 171.

Figure 19:
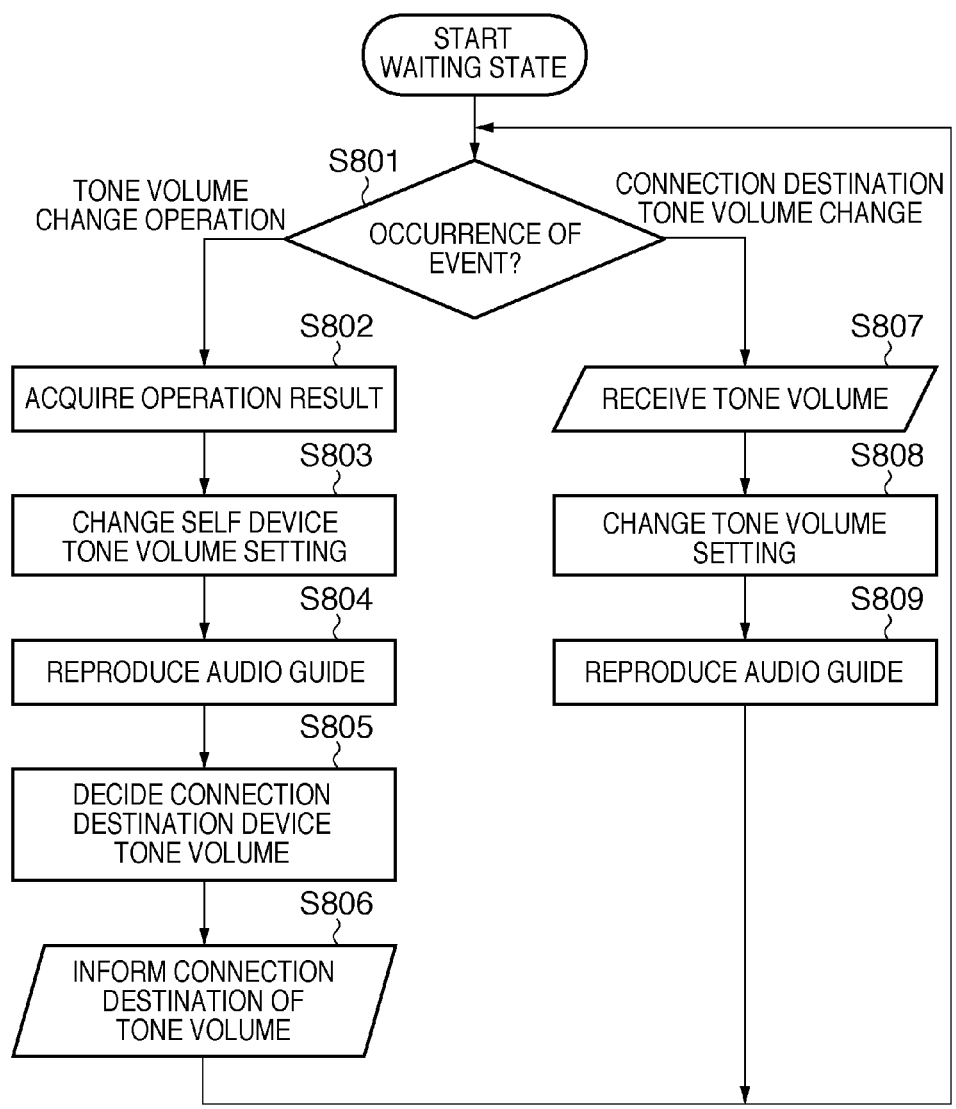
FIG. 19 is a flowchart showing the operation of a computer 22i.

FIG. 19 shows the operations in the computer 22i while the printer 20i and computer 22i are connected.

The control unit 221i does nothing initially, and is set in an event waiting state in step S801 until an arbitrary external event is input. If an event has occurred, the control unit 221i executes processing according to the event. If the processing is finished, the process returns to step S801, and the control unit 221i is set in the event waiting state again.

If the control unit 221i is informed of a tone volume change operation in step S801, that is, if an event of an operation for moving the tone volume setting slider 62 shown in FIG. 17 has occurred ("tone volume change operation" in step S801), the control unit 221i controls the process to advance to step S802.

In step S802, the control unit 221i acquires the current value of the tone volume setting slider 62. In step S803, the control unit 221i informs the tone volume operation unit 228i of that setting value. In response to this, the tone volume operation unit 228i of the computer 22i changes the tone volume reference level of the audio output unit 222 of the computer 22i.

In step S804, the control unit 221i instructs the audio output unit 222 to output an audio guidance. This audio guidance explains that the tone volume has changed. Since the tone volume reference level is set in the tone volume operation unit 228i in step S803, this audio guidance is output to have a tone volume corresponding to the set reference level. That is, every time the user changes the tone volume reference level by operating the tone volume setting slider 62, an audio guidance is output to have a tone volume according to the changed reference level.

In step S805, the tone volume matching unit 2211i of the control unit 221i decides how to change the tone volume reference level of the printer 20i as a connection destination. This processing is done to match the tone volume reference levels of the computer 22i and printer 20i. Details of this processing will be described later. As a result of the processing in step S805, the tone volume matching unit 2211i decides the changed tone volume reference level and validity/invalidity of the mute setting of the printer 20i. After that, the tone volume matching unit 2211i generates the tone volume matching data 170 including the device ID data 171, tone volume data 172, and mute setting data 173, and supplies it to the communication unit 223. In this case, the tone volume data 172 includes, as data of a level to be set, data indicating the tone volume reference level of the audio output unit 222 of the computer 22i, which are changed in step S803.

In step S806, the communication unit 223 of the computer 22i transmits the generated tone volume matching data 170 to the printer 20i. After that, the control unit 221i of the computer 22i controls the process to return to step S801, and returns to the event waiting state again.

On the other hand, the communication unit 203 of the printer 20i receives the tone volume matching data 170 from the computer 22i, and supplies it to the control unit 201i. The tone volume matching unit 2011i of the control unit 201i acquires the tone volume matching data 170 including the device ID data 171, tone volume data 172, and mute setting data 173. That is, the tone volume matching unit 2011i acquires the tone volume reference level of the audio output unit 222 of the computer 22i, which has been changed in step S803. The tone volume matching unit 2011i controls the tone volume operation unit 208i of the printer 20i to change the tone volume reference level of the audio output unit 202 of the printer 20i to a level that matches the acquired tone volume reference level of the audio output unit 222 of the computer 22i.

If the control unit 221i is informed that tone volume matching data is received by the communication unit 223 in step S801, that is, if a tone volume change event from the printer 20i as a connection destination has occurred ("connection destination tone volume change" in step S801), it executes the following operations. The control unit 221i controls the process to advance to step S807.

In step S807, the communication unit 223 supplies the received tone volume matching data to the control unit 221i. The control unit 221i confirms that the device ID data 171 of the received tone volume matching data indicates the self device ID, and then acquires the tone volume data 172 and mute setting data 173. That is, the tone volume matching unit 2211i of the control unit 221i acquires the tone volume reference level of the audio output unit 202 of the printer 20i, which has been changed in step S803.

In step S808, the tone volume matching unit 2211i of the control unit 221i informs the tone volume operation unit 228i of the tone volume reference level and mute setting. The tone volume matching unit 2211i controls the tone volume operation unit 228i of the computer 22i to change the tone volume reference level of the audio output unit 222 of the computer 22i to a level that matches the tone volume reference level of the audio output unit 202 of the printer 20i.

In step S809, the control unit 221i of the computer 22i instructs the audio output unit 222 to output an audio guidance. This audio guidance explains that the tone volume reference level has changed to match that of the connection destination device. Since the tone volume reference level is set in the tone volume operation unit 228i in step S808, this audio guidance is output to have a tone volume according to the set reference level. That is, every time the user changes the tone volume reference level at the printer 20i as the connection destination, an audio guidance is output to have a tone volume according to the changed reference level.

In this case, the sequence of the processing related to the audio guidance output in the control unit 221i of the computer 22i while the printer 20i and computer 22i are connected has been described. Also, the control unit 201i of the printer 20i can execute the same processing. When such printer 20i and computer 22i are connected, and when the user manipulates, for example, the tone volume setting slider 62 on the computer 22i, the processes from step S802 to step S805 are executed. That is, after the computer 22i outputs an audio guidance to have a tone volume set by the user, tone volume change information is transmitted to the printer 20i. Upon reception of this information, the printer 20i executes the processes corresponding to steps S807 to S809. That is, after the tone volume of the printer 20i is changed to that informed from the computer 22i, an audio guidance is output. With these processes, when the tone volume is changed by either one of the connected devices, both the devices alternately output audio guidances to have the matched tone volume.

This embodiment has mainly explained how the control unit 221i of the computer 22i changes the tone volume of the printer 20i when the user operates the computer 22i. However, when the control unit 201i of the printer 20i executes the same processing, it is obvious that the control unit 201i of the printer 20i can change the tone volume of the computer 22i to match with its tone volume when the user operates the printer 20i, contrary to the above description.

As a result of such processes, when a computer and printer, which can output audio guidances by themselves, are connected, the tone volume of the audio guidance is automatically changed to that which is not largely different from that of the connection partner. When each of these devices is carried alone, and even when the tone volume is changed in accordance with a destination environment, if these devices are connected again, the matched tone volumes are automatically recovered.

As described above, according to this embodiment, when a plurality of devices which can output audio guidances are connected, the user can easily understand the contents of the audio guidances by matching the tone volumes of the devices. As a result, since the user can intuitively understand that the plurality of devices operate in a coordinated manner, he or she can ultimately use, at ease, even the complicated coordinated processing attained by connecting the plurality of devices.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-094483, filed Apr. 15, 2010, which are hereby incorporated by reference herein in its entirety.

What is claimed is:

1. A system in which a transmission device and a reception device communicate with each other, said transmission device comprising:

a first output unit which outputs a first audio guidance; and a transmission unit which transmits, to said reception device, output instruction which instructs said reception device to output a second audio guidance related to the first audio guidance and includes output timing data which controls said reception device to start output of the second audio guidance at a timing delayed from an output start timing of the first audio guidance in said transmission device, and said reception device comprising:

a reception unit which receives the output instruction transmitted from said transmission unit; and a second output unit which outputs the second audio guidance at a timing according to the output timing data received by said reception unit, wherein the output timing data instructs said second output unit of said reception device so as to output the second audio guidance at a timing when an output of the first audio guidance by said first output unit is finished, and wherein the output timing data is data indicating a time period until the start of output of the second audio guidance.

2. An output control method of an audio guidance in a system in which a transmission device having a first output unit which outputs a first audio guidance and a reception device having a second output unit which outputs a second audio guidance related to the first audio guidance communicate with each other, the method comprising:

a transmission step of transmitting, to the reception device, output instruction which instructs the reception device to output the second audio guidance and includes output timing data which controls said reception device to start output of the second audio guidance at a timing delayed from an output start timing of the first audio guidance in the transmission device; and an output step of controlling the second output unit to output the second audio guidance at a timing according to the output timing data, wherein the output timing data instructs the second output unit of the reception device so as to output the second audio guidance at a timing when an output of the first audio guidance by the first output unit is finished, and wherein the output timing data is data indicating a time period until the start of output of the second audio guidance.

3. The method according to claim 2, wherein the system is a system in which a plurality of devices including the transmission device and the reception device execute a series of processes in a coordinated manner, and the first audio guidance is an audio guidance corresponding to a first process executed by the transmission device, and the second audio guidance is an audio guidance corresponding to a second process which is executed by the reception device in correspondence with the first process.

4. The method according to claim 2, wherein in the transmission step, the output instruction is transmitted at an output timing of the second audio guidance to control the reception device to output the second audio guidance at a timing delayed from the output start timing of the first audio guidance.

5. The method according to claim 2 wherein the output instruction includes information which instructs an output timing of the second audio guidance, and information which identifies the audio data of the second audio guidance.

6. The method according to claim 2, wherein the output timing data instructs a time period from when the output timing data is received until the second audio guidance starts to be output.

7. The method according to claim 2, further comprising an audio data transmission step of transmitting audio data of the second audio guidance from the transmission device to the reception device before the output instruction is transmitted.

8. The method according to claim 2, wherein in the transmission step, audio data of the second audio guidance is transmitted together with the output instruction.

9. The method according to claim 3, wherein in the transmission step, information indicating that the first process has ended is transmitted to the reception device as the output instruction.

10. A transmission device in a system in which the transmission device having a first output unit which outputs a first audio guidance and a reception device having a second output unit which outputs a second audio guidance related to the first audio guidance communicate with each other, said device comprising:
a transmission unit which transmits, to the reception device, output instruction which instructs the second output unit to output the second audio guidance and includes output timing data which controls said reception device to start output of the second audio guidance at a timing delayed from an output start timing of the first audio guidance in said transmission device,
wherein the output timing data instructs the second output unit of the reception device so as to output the second audio guidance at a timing when an output of the first audio guidance by the first output unit is finished, and
wherein the output timing data is data indicating a time period until the start of output of the second audio guidance.

11. The device according to claim 10, wherein the system is a system in which a plurality of devices including said transmission device and the reception device executes a series of processes in a coordinated manner, and
the first audio guidance is an audio guidance corresponding to a first process executed by said transmission device, and the second audio guidance is an audio guidance corresponding to a second process which is executed by the reception device in correspondence with the first process.

12. The device according to claim 10, wherein said transmission unit transmits the output instruction at an output timing of the second audio guidance to control the second output unit to output the second audio guidance at a timing delayed from the output start timing of the first audio guidance.

13. The device according to claim 10 wherein the output instruction includes information which instructs an output timing of the second audio guidance, and information which identifies the audio data of the second audio guidance.

14. The device according to claim 10, wherein the output timing data instructs a time period from when the output timing data is received until the second audio guidance starts to be output.

15. The device according to claim 10, further comprising an audio data transmission unit which transmits audio data of the second audio guidance from said transmission device to the reception device before the output instruction is transmitted.

16. The device according to claim 10, wherein said transmission unit transmits audio data of the second audio guidance together with the output instruction.

17. The device according to claim 11, wherein said transmission unit transmits information indicating that the first process has ended to the reception device as the output instruction.

18. A reception device in a system in which a transmission device having a first output unit which outputs a first audio guidance and a reception device having a second output unit which outputs a second audio guidance related to the first audio guidance communicate with each other, said device comprising:
a reception unit which receives, from the transmission device, output instruction which instructs the second output unit to output the second audio guidance and includes output timing data which controls said reception device to start output of the second audio guidance at a timing delayed from an output start timing of the first audio guidance in the transmission device;
an audio data reception unit which receives audio data of the second audio guidance before the output instruction is received; and
an output control unit which controls the second output unit to output the second audio guidance based on the output timing data,
wherein the system is a system in which a plurality of devices including the transmission device and said reception device executes a series of processes in a coordinated manner, the first audio guidance is an audio guidance corresponding to a first process executed by the transmission device, and the second audio guidance is an audio guidance corresponding to a second process which is executed by the reception device in correspondence with the first process,
the output instruction includes information which instructs an output timing of the second audio guidance, and information which identifies the audio data of the second audio guidance, and
wherein the output timing data instructs the second output unit of the reception device so as to output the second audio guidance at a timing when an output of the first audio guidance by the first output unit is finished, and
wherein the output timing data is data indicating a time period until the start of output of the second audio guidance.

19. The device according to claim 10, wherein said transmission unit transmits the output instruction before the first output unit outputs the first audio guidance.

20. The device according to claim 11, wherein the first output unit outputs the first audio guidance at a timing when said transmission unit finished the transmission of the output instruction.

21. The device according to claim 10, wherein the output timing data instructs a time period from when the output timing data is received until the second audio guidance starts to be output.

22. A non-transitory computer readable medium storing a program causing a computer to perform each function of the transmission device defined in claim 10.

23. A non-transitory computer readable medium storing a program causing a computer to perform each function of the reception device defined in claim 18.

* * * * *